(12) United States Patent
Sugaya et al.

(10) Patent No.: US 10,667,300 B2
(45) Date of Patent: May 26, 2020

(54) COMMUNICATION APPARATUS AND COMMUNICATION METHOD

(71) Applicant: SONY CORPORATION, Tokyo (JP)

(72) Inventors: Shigeru Sugaya, Kanagawa (JP);
Yuichi Morioka, Kanagawa (JP);
Takeshi Itagaki, Saitama (JP)

(73) Assignee: SONY CORPORATION, Tokyo (JP)

(*) Notice: Subject to any disclaimer, the term of this patent is extended or adjusted under 35 U.S.C. 154(b) by 141 days.

(21) Appl. No.: 15/557,483

(22) PCT Filed: Apr. 19, 2016

(86) PCT No.: PCT/JP2016/062368
§ 371 (c)(1),
(2) Date: Sep. 12, 2017

(87) PCT Pub. No.: WO2017/006608
PCT Pub. Date: Jan. 12, 2017

(65) Prior Publication Data
US 2018/0063867 A1     Mar. 1, 2018

(30) Foreign Application Priority Data
Jul. 6, 2015   (JP) .................................. 2015-135465

(51) Int. Cl.
*H04W 72/02* (2009.01)
*H04W 72/04* (2009.01)
(Continued)

(52) U.S. Cl.
CPC ..... *H04W 74/085* (2013.01); *H04W 72/0413* (2013.01); *H04W 72/0446* (2013.01);
(Continued)

(58) Field of Classification Search
None
See application file for complete search history.

(56) References Cited

U.S. PATENT DOCUMENTS

2010/0029325 A1   2/2010   Wang et al.
2010/0220679 A1   9/2010   Abraham et al.
(Continued)

FOREIGN PATENT DOCUMENTS

JP   2012-519427 A   8/2012
JP   2015-511077 A   4/2015
JP   2016/062368 A1  4/2016

OTHER PUBLICATIONS

International Search Report dated Jul. 19, 2016 in PCT/JP2016/062368 filed Apr. 19, 2016.
(Continued)

*Primary Examiner* — Duc T Duong
(74) *Attorney, Agent, or Firm* — Xsensus LLP

(57) ABSTRACT

[Object] To provide a communication apparatus and a communication method which are capable of suppressing a decrease in communication efficiency in UL communication of a random access scheme.

[Solution] Provided is a communication apparatus, including a communication unit configured to transmit a trigger frame including sub area information in which a sub area is specified from a resource area including wireless communication resources selectable as uplink resources and receive a response frame to the trigger frame. Provided is a communication apparatus, including a communication unit configured to receive a trigger frame including sub area information in which a sub area is specified from a resource area including wireless communication resources selectable as uplink resources and transmit a response frame to the trigger frame.

17 Claims, 24 Drawing Sheets

(51) Int. Cl.
  *H04W 74/08* (2009.01)
  *H04W 84/12* (2009.01)
  *H04W 74/00* (2009.01)
  *H04W 72/08* (2009.01)
  *H04W 72/12* (2009.01)

(52) U.S. Cl.
  CPC ....... *H04W 72/082* (2013.01); *H04W 74/006* (2013.01); *H04W 84/12* (2013.01); *H04W 72/1268* (2013.01)

(56) References Cited

U.S. PATENT DOCUMENTS

| | | |
|---|---|---|
| 2013/0229996 A1 | 9/2013 | Wang et al. |
| 2015/0063190 A1 | 3/2015 | Merlin et al. |
| 2015/0063258 A1* | 3/2015 | Merlin .................... H04L 47/12 370/329 |
| 2015/0172012 A1 | 6/2015 | Abeysekera et al. |
| 2016/0119881 A1* | 4/2016 | Merlin ................ H04W 52/146 370/328 |
| 2016/0134406 A1* | 5/2016 | Chu ...................... H04L 5/0037 370/329 |
| 2016/0165574 A1* | 6/2016 | Chu ...................... H04L 5/0007 370/312 |
| 2016/0242070 A1* | 8/2016 | Asterjadhi ............ H04L 5/0055 |
| 2016/0295624 A1* | 10/2016 | Novlan ................ H04W 76/14 |
| 2016/0316473 A1* | 10/2016 | Wang ................ H04W 72/0453 |
| 2016/0323424 A1* | 11/2016 | Merlin .................... H04L 69/22 |
| 2016/0345349 A1* | 11/2016 | Ferdowsi .......... H04W 72/1268 |
| 2016/0360443 A1* | 12/2016 | Hedayat ............... H04B 7/0452 |
| 2017/0214504 A1 | 7/2017 | Merlin et al. |
| 2017/0223665 A1* | 8/2017 | Chun ...................... H04L 27/26 |
| 2018/0359761 A1* | 12/2018 | Chun ........................ H04L 5/00 |

OTHER PUBLICATIONS

Supplementary European Search Report dated Jan. 29, 2018 in European Patent Application No. 16821079.7, 6 pages.
Chittabrata Ghosh, et al., "Random Access with Trigger Frames using OFDMA", IEEE 802.11-15/0604r0, XP068094472, May 12, 2015, pp. 1-16.
Kiseon Ryu, et al.. "UL MU Procedure", IEEE 802.11-15/0365r0, XP068083020, Mar. 9, 2015, pp. 1-16.
Tomoko Adachi, et al, "Regarding trigger frame in UL MU", IEEE 802.11-15/0608r1, XP068094476, May 10, 2015, pp. 1-16.
Search Report and Written Opinion issued in Singaporean Application 11201706934R dated Dec. 27, 2018.

* cited by examiner

FIG. 14

| Parameter | Condition |
|---|---|
| 0x00 | Reserved |
| 0x01 | Frame Type : Probe Request |
| 0x02 | Frame Type : Power Save Polling |
| 0x03 | Frame Type : Other Control Frame |
| 0x04 | Frame Type : Data Frame |
| 0x05-0x08 | Reserved |
| 0x09 | Buffered Data Length : 1-127 Octets |
| 0x0A | Buffered Data Length : 128-1023 Octets |
| 0x0B | Buffered Data Length : 1K-1M Octets |
| 0x0C | Buffered Data Length : LARGER THAN 1M OCTETS |
| 0x0D-0x0F | Reserved |
| 0x10 | Receive Signal Strength : WEAK |
| 0x11 | Receive Signal Strength : STRONG |
| 0x12-0x1F | Reserved |
| 0x20 | MCS(Modulation and Coding Scheme) : BPSK / QPSK |
| 0x21 | MCS(Modulation and Coding Scheme) : 16QAM / 64 QAM |
| 0x22 | MCS(Modulation and Coding Scheme) : 256QAM |
| 0x23-0x3F | Reserved |
| 0x40-0xFF | Reserved |

FIG. 15A

| Bit | Channel ID |
|---|---|
| 0 | Channel 36 |
| 1 | Channel 40 |
| 2 | Channel 44 |
| 3 | Channel 48 |
| 4 | Channel 52 |
| 5 | Channel 56 |
| 6 | Channel 60 |
| 7 | Channel 62 |

FIG. 15B

| Bit | IFS |
|---|---|
| 0 | SIFS×2 |
| 1 | SIFS×4 |
| 2 | SIFS×6 |
| 3 | SIFS×8 |
| 4 | SIFS×10 |
| 5 | SIFS×12 |
| 6 | SIFS×14 |
| 7 | SIFS×16 |

FIG. 15C

| Bit | Stream Index |
|-----|--------------|
| 0   | 0            |
| 1   | 1            |
| 2   | 2            |
| 3   | 3            |
| 4   | 4            |
| 5   | 5            |
| 6   | 6            |
| 7   | 7            |

COMMUNICATION APPARATUS AND COMMUNICATION METHOD

TECHNICAL FIELD

The present disclosure relates to communication apparatuses and communication methods.

BACKGROUND ART

Wireless local area networks (LANs), typified by IEEE (Institute of Electrical and Electronics Engineers) 802.11, have in recent years been widespread, leading to an increase in the number of wireless LAN-capable products.

Here, wireless LAN-capable products are classified into, for example, access points (hereinafter, also referred to as "APs") and stations (hereinafter, also referred to as "STAs") Further, communication from an AP to an STA called downlink (hereinafter, also referred to as "DL") communication and communication from an STA to an AP called uplink (hereinafter, also referred to as "UL") are performed.

With the increase in the number of wireless LAN-capable products, the number of STAs also increases, and thus there is a possibility that the incidence of frame (packet) collision in uplink communication will increase.

In this regard, Patent Literature 1 discloses a communication method of multiplexing UL transmission such that an STA having received a predetermined frame such as group polling from an AP transmits frames using a channel notified of through the predetermined frame. Thus, collision of UL transmission frames can be suppressed.

CITATION LIST

Patent Literature

Patent Literature 1: JP 2015-511077T

DISCLOSURE OF INVENTION

Technical Problem

However, the communication method disclosed in Patent Literature 1 is a method belonging to a so-called control access scheme in which UL transmission of the STA is controlled in accordance with a notification given from the AP. For this reason, UL communication of a so-called random access scheme in which the STA arbitrarily performs UL transmission is not a subject thereof.

In this regard, the present disclosure proposes a communication apparatus and a communication method, which are novel and improved and capable of suppressing a decrease in communication efficiency in the UL communication of the random access scheme.

Solution to Problem

According to the present disclosure, there is provided a communication apparatus, including a communication unit configured to transmit a trigger frame including sub area information in which a sub area is specified from a resource area including wireless communication resources selectable as uplink resources and receive a response frame to the trigger frame.

Further, according to the present disclosure, there is provided communication apparatus, including a communication unit configured to receive a trigger frame including sub area information in which a sub area is specified from a resource area including wireless communication resources selectable as uplink resources and transmit a response frame to the trigger frame.

Further, according to the present disclosure, there is provided a communication method, including transmitting a trigger frame including sub area information in which a sub area is specified from a resource area including wireless communication resources selectable as uplink resources, and receiving a response frame to the trigger frame.

Further, according to the present disclosure, there is provided communication method, including receiving a trigger frame including sub area information in which a sub area is specified from a resource area including wireless communication resources selectable as uplink resources, and transmitting a response frame to the trigger frame.

Advantageous Effects of Invention

As described above, according to the present disclosure, a communication apparatus and a communication method which are capable of suppressing a decrease in communication efficiency in the UL communication of the random access scheme are provided. Note that the above advantageous effects are not necessarily limiting. In addition to or instead of the above advantageous effects, any of the advantageous effects described in the present specification or other advantageous effects apparent from the present specification may be provided.

BRIEF DESCRIPTION OF DRAWINGS

FIG. 14 is a diagram illustrating an example of a transmission setting condition included in a condition parameter field of a trigger frame to be transmitted according to the present embodiment.

FIG. 15A is a diagram illustrating an example of information included in a frequency map field of a trigger frame to be transmitted according to the present embodiment.

FIG. 15B is a diagram illustrating an example of information included in a timing map field of a trigger frame to be transmitted according to the present embodiment.

FIG. 15C is a diagram illustrating an example of information included in a spatial map field of a trigger frame to be transmitted according to the present embodiment.

MODE(S) FOR CARRYING OUT THE INVENTION

Figure 1:
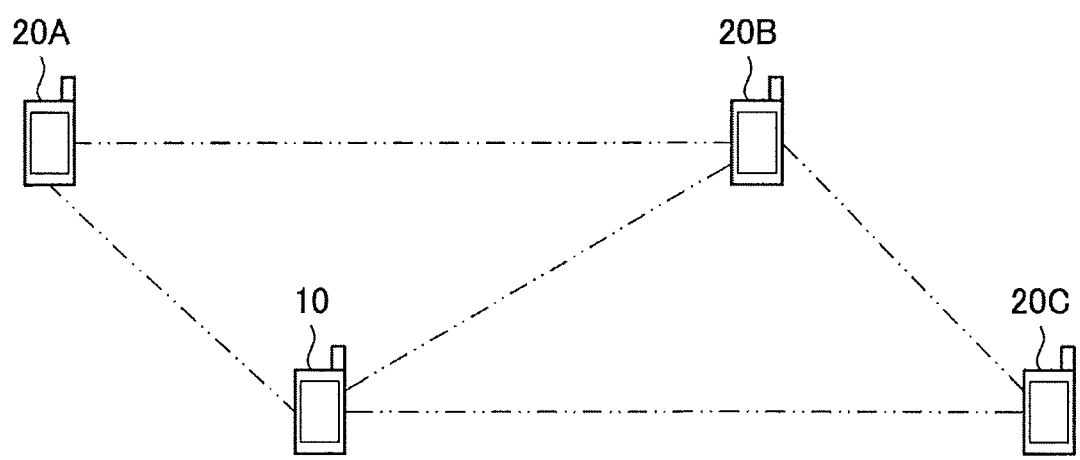
FIG. 1 is a diagram illustrating an example of a configuration of a communication system according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, there are cases in which a plurality of components having substantially the same function are distinguished by adding different numbers to the end of the same reference numeral. For example, a plurality of components having substantially the same function are distinguished as necessary like an STA 20# A and an STA 20# B. However, in a case where it is unnecessary to distinguish components having substantially the same function, only the same reference numeral is added. For example, in a case where it is unnecessary to particularly distinguish an STA 20# A and an STA 20# B, they are referred to as simply as an "STA 20."

Note that the description will proceed in the following order.

1. Overview of communication system according to embodiment of present disclosure and problems of related art
2. First embodiment (UL transmission control based on resource area)
  2-1. Configurations of apparatuses
  2-2. Technical features
  2-3. Processes of apparatuses
  2-4. Conclusion of first embodiment
  2-5. Modified examples
3. Second embodiment (collection of information related to UL transmission using sub area)
  3-1. Configurations of apparatuses
  3-2. Technical features
  3-3. Processes of apparatuses
  3-4. Conclusion of second embodiment
4. Application examples
5. Conclusion

1. OVERVIEW OF COMMUNICATION SYSTEM ACCORDING TO EMBODIMENT OF PRESENT DISCLOSURE AND PROBLEMS OF RELATED ART

First, an overview of a communication system related to an embodiment of the present disclosure and problems of the related art will be described with reference to FIG. 1. FIG. 1 is a diagram illustrating an example of a configuration of a communication system according to an embodiment of the present disclosure.

The communication system includes a communication apparatus 10 and a plurality of communication apparatuses 20. The communication apparatus 10 and the communication apparatus 20 have a wireless communication function and communicate with each other. For example, the communication apparatus 10 operates as an AP, and the communication apparatus 20 operates as an STA. Hereinafter, the communication apparatus 10 is also referred to as an "AP 10," and the communication apparatus 20 is also referred to as an "STA 20." Thus, both the DL communication and the UL communication can be performed in the communication system.

For example, the communication system may be configured with the AP 10 and a plurality of STAs 20#1 to 20#4 as illustrated in FIG. 1. The AP 10 and the STAs 20#1 to 20#4 are connected through wireless communication and perform transmission and reception of frames directly. For example, the AP 10 transmits DL frames whose destinations are the STAs 20#1 to 20#4. Each of the STAs 20#1 to 20#4 transmits a UL frame whose destination is the AP 10.

Figure 2:
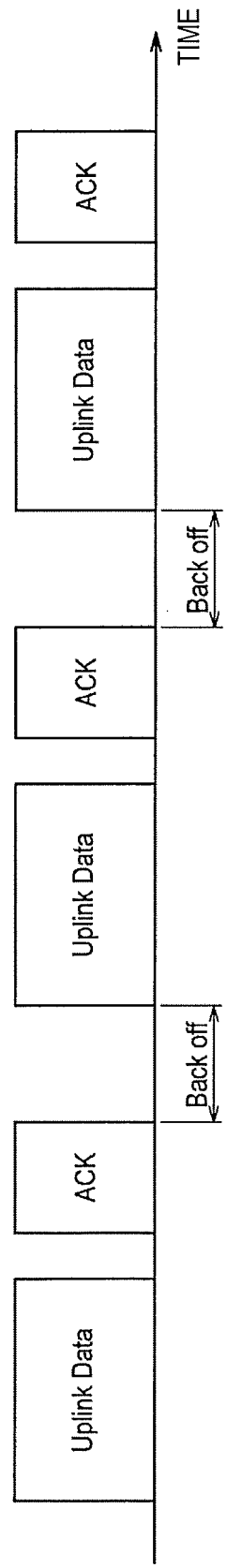
FIG. 2 is a diagram illustrating an example of a frame exchange sequence in UL communication according to a related art.

Here, the transmission of the UL frame may be performed according to the random access scheme. The transmission of the UL frame according to the related art will be described with reference to FIG. 2. FIG. 2 is a diagram illustrating an example of a frame exchange sequence in UL communication according to the related art.

In the random access scheme, the STA starts communication of the UL frame at an arbitrary timing. The other STAs start their UL communication after the UL communication ends. For example, as illustrated in FIG. 2, uplink data (hereinafter, also referred to as "ULD") is transmitted as a UL frame from a certain STA, and an acknowledgement (ACK) is transmitted as a response frame to the UL frame from the AP. The other STAs start transmission of their own ULDs, for example, after a back-off period of time elapses in addition to a period of time of a predetermined inter-frame space after the reception of the ACK.

However, when the number of STAs increases, the UL frames are likely to collide with each other. For example, when the number of STAs increases, a probability that the STAs starting the UL communication initially will overlap increases. A probability that the STAs starting the UL communication after the back-off period of time will overlap increases as well. As a result, the UL frames may collide with each other, and use efficiency of wireless communication resources (hereinafter, also referred to simply as "resources") such as frequency resources may decrease.

In this regard, applying the communication method for multiple users in the DL communication to the UL communication is considered. For example, in the wireless the communication system according to the related art, as a method of performing DL communication from the AP to a plurality of STAs, a method of aggregating a plurality of frames into one physical layer burst and transmitting a plurality of frames or a method of transmitting a plurality of frames using frequency division multiplexing or space division multiplexing is used. A case in which the method using the multiplexing is applied to the UL communication, and the UL frames are transmitted from a plurality of STAs to the AP at the same timing is considered.

Here, in the UL communication using the frame multiplexing (hereinafter, also referred to as "UL multiplex communication"), it is consequential to set communication parameters of a plurality of STAs performing the UL communication at the same timing. For example, it is desirable that the UL frames transmitted from a plurality of STAs be separable in terms of frequency or space and orthogonal to one another, and transmission times of the UL frames be synchronized with one another. Otherwise, it is hard for the AP to receive the UL frames properly.

Meanwhile, generally, the STAs differ in the communication parameter. Specifically, a type or a size of data transmitted through the UL communication differs. For example, the data size differs with a width of several octets to several thousands of octets depending on an attribute of data or a frame.

Further, a modulation parameter used in the UL communication differs. For example, in the wireless communication system according to the wireless LAN standard, a plurality of modulation rates (modulation schemes) are prepared, and each time a transmission side communication apparatus performs communication, a modulation rate determined to be optimal is selected, and data is transmitted using the selected modulation rate. An available modulation rate changes in accordance with a distance between the AP and the STA. A period of time taken for data transmission changes in accordance with a modulation rate.

Further, there are cases in which a plurality of frequency channels serving as one of the communication parameters are usable. For example, in the wireless communication system according to the wireless LAN standard or the like, a channel bonding technique is known as a multiplexing technique based on orthogonal frequency division multiplexing (OFDM). In the channel bonding technique, by bundling a plurality of frequency channels having a bandwidth of 20 MHz, frame transmission can be performed, for example, using a bandwidth of 40 MHz, a bandwidth of 80 MHz, and a bandwidth of 160 MHz.

Further, the distances between the AP and the STA are not generally uniformly distributed, and thus the STAs are likely to differ in the communication parameter. For example, in addition to the modulation rate, the communication parameter such as a transmission signal strength may differ in accordance with the distance between the AP and the STA.

For this reason, in the random access scheme, it is difficult to match the communication parameters of a plurality of STAs, and thus the communication efficiency of the UL multiplex communication may be lowered. A method of separately collecting the communication parameters is considered, but since communication for collecting the communication parameters is newly performed, the communication efficiency of the UL multiplex communication may be lowered as well.

On the other hand, in the control access scheme, the AP performs an inquiry of inquiring of each of the STAs about the presence or absence of a UL communication request (hereinafter, also referred to as an "uplink request (ULR)") using polling in order to allocate UL transmission resources. For this reason, it is difficult for the STA to transmit the ULR until polling is performed, and in a case where polling is not performed, it may be difficult to transmit frames related to the ULR. A case in which the ULR is received from the STA without performing polling is considered, but in this case, since the ULR frames are transmitted in order of time without being multiplexed, the resource use efficiency is lowered.

As described above, in the communication technique of the related art, when the number of STAs increases, frame collision may frequently occur in the UL communication of the random access scheme. Further, it may be hard to specify the communication parameters suitable for the UL communication of the random access scheme. As a result, the communication efficiency of the UL communication is likely to be lowered.

In this regard, in the present disclosure, a communication apparatus capable of suppressing a decrease in the communication efficiency of the UL communication of the random access scheme is proposed. The details thereof will be described below. In FIG. 1, the communication system configured with the AP 10 and the STAs 20 has been described as an example of the communication system, but one of the STAs 20 may be a communication apparatus having a plurality of direct links with the other STAs 20 instead of the AP 10. In this case, DL may be interpreted as "simultaneous transmission from one STA to a plurality of STAs," and UL may be interpreted as "simultaneous transmission from a plurality of STAs to one STA." For the sake of convenience of description, an AP 10, an STA 20, and a communication apparatus 100 in first and second embodiments are distinguished by adding a number corresponding to an embodiment to the end thereof like an AP 10-1 and an AP 10-2.

2. FIRST EMBODIMENT (UL TRANSMISSION CONTROL BASED ON RESOURCE AREA)

The overview of the communication system according to an embodiment of the present disclosure has been described above. Next, an AP 10-1 and an STA 20-1 according to the first embodiment of the present disclosure will be described.

2-1. Configurations of Apparatuses

Figure 3:
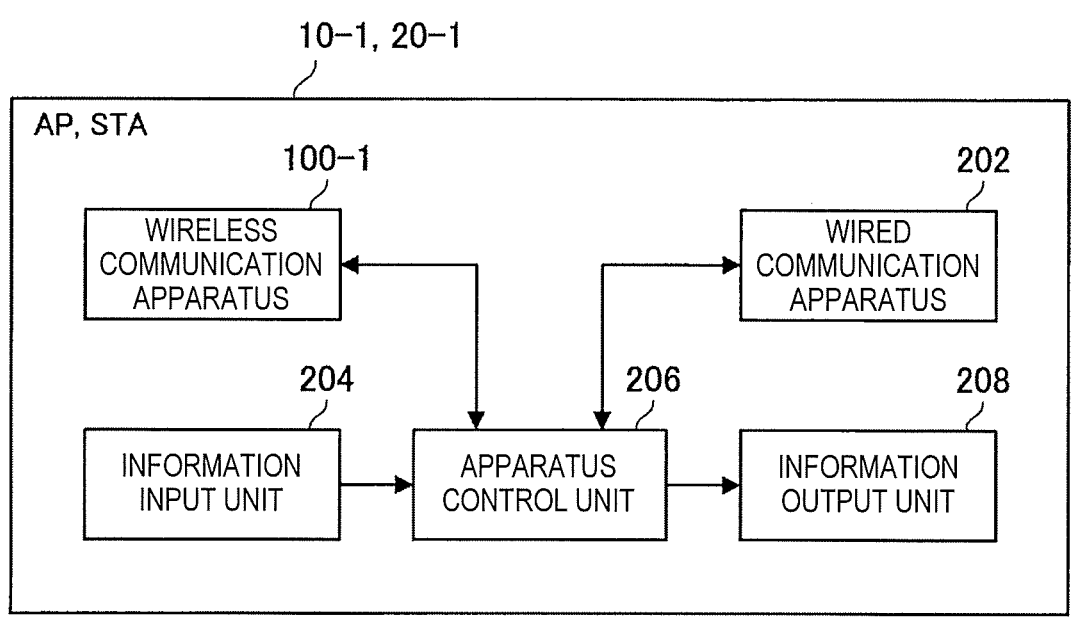
FIG. 3 is a block diagram illustrating an example of schematic functional configurations of an AP and an STA according to the first embodiment of the present disclosure.

First, functional configurations of the AP 10-1 and the STA 20-1 according to the first embodiment of the present disclosure will be described with reference to FIG. 3. FIG. 3 is a block diagram illustrating an example of schematic functional configurations of the AP 10-1 and the STA 20-1 according to the first embodiment of the present disclosure.

Each of the AP 10-1 and the STA 20-1 (hereinafter, also referred to as "AP 10-1, etc.") includes a wireless communication apparatus 100-1, a wired communication apparatus 202, an information input unit 204, an apparatus control unit 206, and an information output unit 208 as illustrated in FIG. 3.

The wireless communication apparatus 100-1 performs wireless communication with the AP 10-1 or the STA 20-1. Specifically, the wireless communication apparatus 100-1 performs wireless communication of data acquired from the apparatus control unit 206. The details thereof will be described later.

The wired communication apparatus 202 performs wired communication with an external apparatus. Specifically, the wired communication apparatus 202 is connected with the Internet, and performs communication with an external apparatus via the Internet. For example, the wired communication apparatus 202 transmits data acquired by the wireless communication apparatus 100-1 through communication to an external apparatus via the Internet.

The information input unit 204 receives an input. Specifically, the information input unit 204 receives a user input or information obtained from a sensor. For example, the information input unit 204 may be an input apparatus such as a keyboard or a touch panel. The information input unit 204 converts a signal obtained by an imaging sensor into image information.

The apparatus control unit 206 controls an operation of the AP 10-1, etc. in general. Specifically, the apparatus control unit 206 controls communication of the wireless communication apparatus 100-1 or the wired communication apparatus 202. For example, the apparatus control unit 206 causes the wireless communication apparatus 100-1 or the wired communication apparatus 202 to transmit data obtained from the information input unit 204, and causes the information output unit 208 to output data obtained through communication of the wireless communication apparatus 100-1 or the wired communication apparatus 202.

The information output unit 208 outputs data. Specifically, the information output unit 208 outputs data as instructed by the apparatus control unit 206. For example, the information output unit 208 may be a display that performs display output on the basis of image information, a speaker that performs audio output on the basis of audio information, or the like.

(Configuration of Wireless Communication Apparatus)

Figure 4:
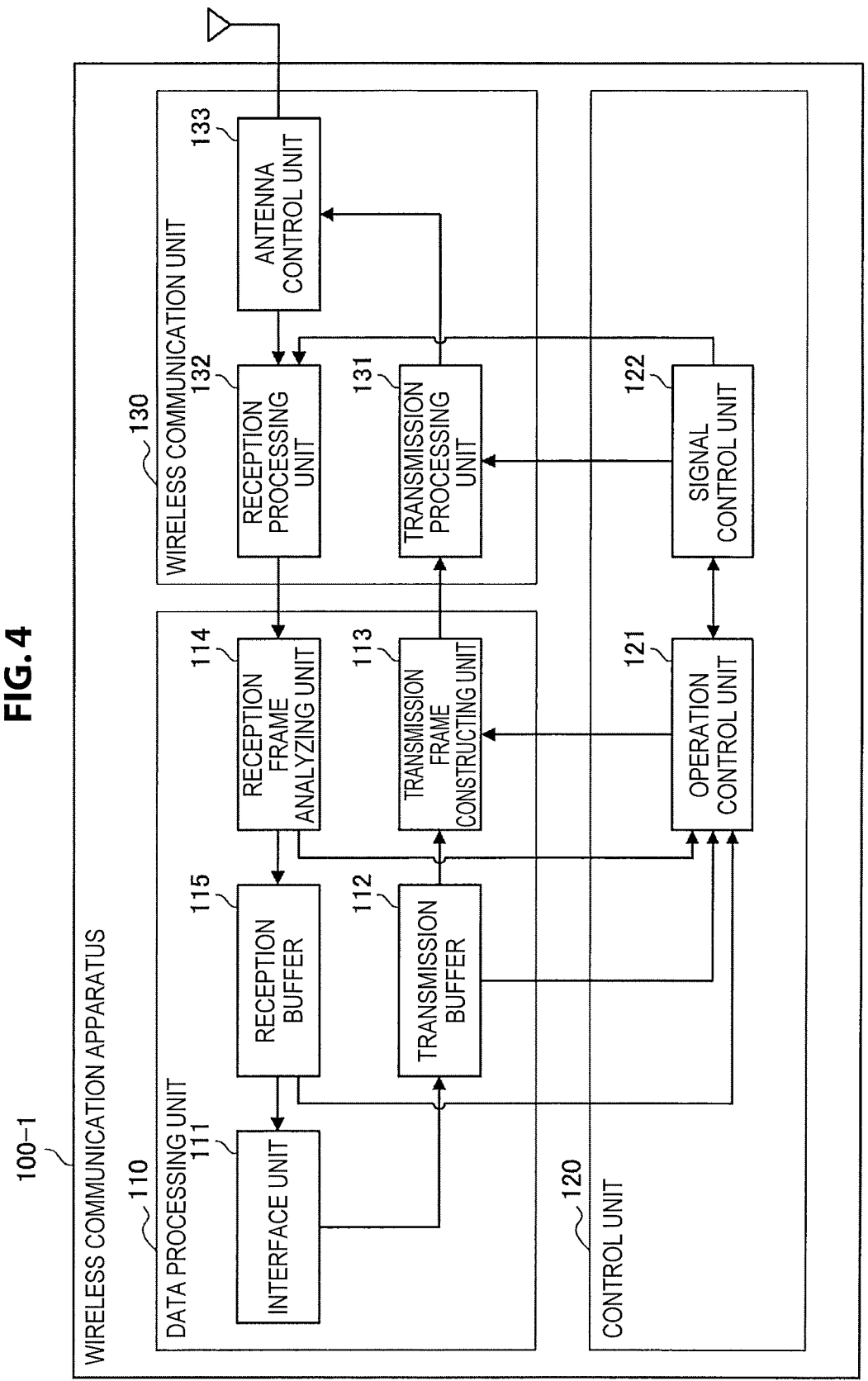
FIG. 4 is a block diagram illustrating an example of a schematic functional configuration of a wireless communication apparatus according to the first embodiment of the present disclosure.

Next, a functional configuration of the wireless communication apparatus 100-1 will be described with reference to FIG. 4. FIG. 4 is a block diagram illustrating an example of a schematic functional configuration of the wireless communication apparatus 100-1 according to the first embodiment of the present disclosure.

The wireless communication apparatus 100-1 includes a data processing unit 110, a control unit 120, and a wireless communication unit 130 as communication units as illustrated in FIG. 4.

(Data Processing Unit)

The data processing unit 110 includes an interface unit 111, a transmission buffer 112, a transmission frame constructing unit 113, a reception frame analyzing unit 114, and a reception buffer 115 as illustrated in FIG. 4.

The interface unit 111 is an interface that is connected with the other functional components other than the above-described functional components in the AP 10-1, etc. Specifically, the interface unit 111 performs reception of transmission data from other functional components, provision of reception data to other functional components, or the like.

The transmission buffer 112 stores data to be transmitted. Specifically, the transmission buffer 112 stores data obtained through the interface unit 111.

The transmission frame constructing unit 113 generates a frame to be transmitted. Specifically, the transmission frame constructing unit 113 generates a frame on the basis of data stored in the transmission buffer 112 or control information set by the control unit 120. The control information may be information such as resource information related to a trigger frame which will be described later. For example, the transmission frame constructing unit 113 generates a frame (or a packet) from data, and performs, for example, a process of adding a MAC header for media access control (MAC) and an error detection code to a generated frame.

The reception frame analyzing unit 114 analyzes a received frame. Specifically, the reception frame analyzing unit 114 performs determination of a destination of a frame received by the wireless communication unit 130 and acquisition of data or control information included in the frame. For example, the reception frame analyzing unit 114 acquires data or the like by performing analysis of a MAC header, detection and correction of a code error, a reorder process, or the like on the received frame.

The reception buffer 115 stores the received data. Specifically, the reception buffer 115 stores data acquired by the reception frame analyzing unit 114.

(Control Unit)

The control unit 120 includes an operation control unit 121 and a signal control unit 122 as illustrated in FIG. 4.

The operation control unit 121 performs operation control on wireless communication. Specifically, the operation control unit 121 controls the occurrence of communication. For example, when a communication connection request occurs, the operation control unit 121 causes the data processing unit 110 to generate frames related to a connection process such as an association process or an authentication process. Further, when a transmission request of a trigger frame which will be described later occurs, the operation control unit 121 causes the data processing unit 110 to generate the trigger frame.

Further, the operation control unit 121 controls frame generation on the basis of a storage state of data in the transmission buffer 112, an analysis result of a reception frame, or the like. For example, in a case where data is stored in the transmission buffer 112, the operation control unit 121 instructs the transmission frame constructing unit 113 to generate a data frame in which the data is stored. Further, in a case where reception of the data frame is detected by the reception frame analyzing unit 114, the operation control unit 121 instructs the transmission frame constructing unit 113 to generate an ACK frame serving as a response to the data frame.

Further, the operation control unit 121 manages resources used in frame transmission. Specifically, the operation control unit 121 manages resource information which will be described later. For example, the operation control unit 121 decides a resource unit in the case of the AP 10-1 and registers a resource unit to be notified of in the case of the STA 20-1.

The signal control unit 122 controls an operation of the wireless communication unit 130. Specifically, the signal management unit 122 controls transmission and reception processes of the wireless communication unit 130. For example, in the case of the STA 20-1, the signal control unit 122 causes the wireless communication unit 130 to perform UL transmission using some resources (one or more resource units) in a resource area which will be described later on the basis of an instruction given by the operation control unit 121.

(Wireless Communication Unit)

The wireless communication unit 130 includes a transmission processing unit 131, a reception processing unit 132, and an antenna control unit 133 as illustrated in FIG. 4.

The transmission processing unit 131 performs a frame transmission process. Specifically, the transmission processing unit 131 generates a signal to be transmitted on the basis of the frame provided from the transmission frame constructing unit 113. More specifically, the transmission processing unit 131 generates a signal related to the UL frame on the basis of resources instructed by the signal control unit 122. For example, the transmission processing unit 131 generates a symbol stream by performing encoding, interleaving, and modulation on the frame provided from the data processing unit 110, for example, according to a coding and modulation scheme set by the control unit 120. The transmission processing unit 131 converts a signal related to the symbol stream obtained by the process at the previous stage into an analog signal, and performs amplification, filtering, and frequency up-conversion on the analog signal.

Further, the transmission processing unit 131 performs a frame multiplexing process. Specifically, the transmission processing unit 131 performs a process related to the frequency division multiplexing or the space division multiplexing.

The reception processing unit 132 performs a frame reception process. Specifically, the reception processing unit 132 performs frame reconstruction on the basis of the signal provided from the antenna control unit 133. For example, the reception processing unit 132 is on standby for reception of the signal related to the UL frame within a range of resources secured as a resource area in the case of the AP 10-1. In detail, the reception processing unit 132 acquires the symbol stream by performing a process opposite to that at the time of signal transmission such as frequency downconversion and digital signal conversion on the signal acquired from the antenna. The reception processing unit 132 acquires the frame by performing, for example, demodulation and decoding on the symbol stream obtained by the process at the previous stage, and provides the acquired frame to the data processing unit 110 or the control unit 120.

Further, the reception processing unit 132 performs a process related to separation of a multiplexed frame. Specifically, the reception processing unit 132 performs a process related to separation of a frame that has undergone the frequency division multiplexing or the space division multiplexing.

Further, the reception processing unit 132 estimates a channel gain. Specifically, the reception processing unit 132 calculates complex channel gain information on the basis of a preamble portion or a training signal portion of the signal obtained from the antenna control unit 133. The calculated complex channel gain information is used in a process related to frame multiplexing, a frame separation process, and the like.

The antenna control unit 133 performs transmission and reception of a signal through at least one antenna. Specifically, the antenna control unit 133 transmits the signal generated by the transmission processing unit 131 through the antenna, and provides the signal received through the antenna to the reception processing unit 132. The antenna control unit 133 performs control related to the space division multiplexing.

2-2. Technical Features

Next, characteristic functions of the AP 10-1 and the STA 20-1 according to the first embodiment of the present disclosure will be described. The present embodiment will be described in connection with an example in which the frame related to the ULR is transmitted as the response to the trigger frame, and then the data frame related to the ULR is transmitted.

((Functions of AP))

First, characteristic functions of the AP 10-1 will be described.

(Decision of Resource Area)

Figure 5:
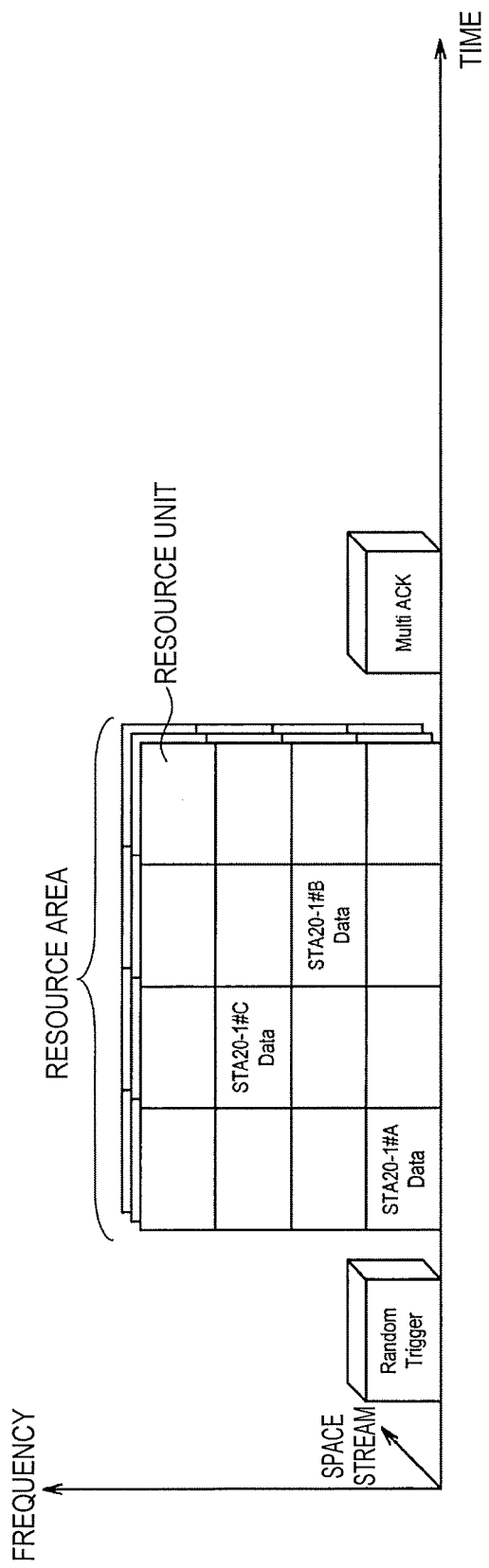
FIG. 5 is a diagram for describing an example of allocation and usage of resources in communication performed by an AP and an STA according to the present embodiment.

The AP 10-1 decides resources selectable as UL resources. Specifically, the control unit 120 decides unit resources (resource units) available for the UL transmission, and decides overall resources (a resource area) on the basis of the decided resource units. A resource area decision process will be described in detail with reference to FIG. 5. FIG. 5 is a diagram for describing an example of allocation and usage of resources in communication performed by the AP 10-1, etc. according to the present embodiment.

The control unit 120 decides resource units for the UL transmission, and decides a resource area on the basis of the size of the resource unit and the number of resource units. For example, the resource unit is specified by time, frequency, and a space stream as illustrated in FIG. 5. The resource area is an aggregation of resource units. The resource unit may be specified by two of the time, the frequency, and the space stream.

As will be described later, a notification of information about the resource unit is given to the STA 20-1, and the STA 20-1 having a UL transmission request selects the resource units on the basis of the information of which it is notified. Then, the STA 20-1 performs the UL transmission using resources (hereinafter, also referred to as "resource units") related to the selected resource unit.

Here, the STAs 20-1 are assumed to perform the UL transmission according to the random access scheme. In this case, the STAs 20-1 autonomously select the resource unit and perform the UL transmission, and thus the used resource units are likely to overlap. For example, as illustrated in FIG. 5, each of the STAs 20-1#A to 20-1#C selects the resource units and transmits the data frame using the selected resource unit. In the example of FIG. 5, the resource units selected by the STAs 20-1#A to 20-1#C do not overlap, but when the number of STAs 20-1 increases, the selected resource units are likely to overlap. When the selected resource units overlap, frame collision occurs.

Further, the STA 20-1 can transmit various frames using the selected resource unit. For example, in the case of the data frame, a frame length differs in accordance with a data size of a transmission target. For this reason, the AP 10-1 prepares the resource units sufficiently in order to prevent a shortage of resource units. As a result, more resource units than resources that are actually used are often excessively prepared, leading to a decrease in the resource use efficiency.

Figure 6:
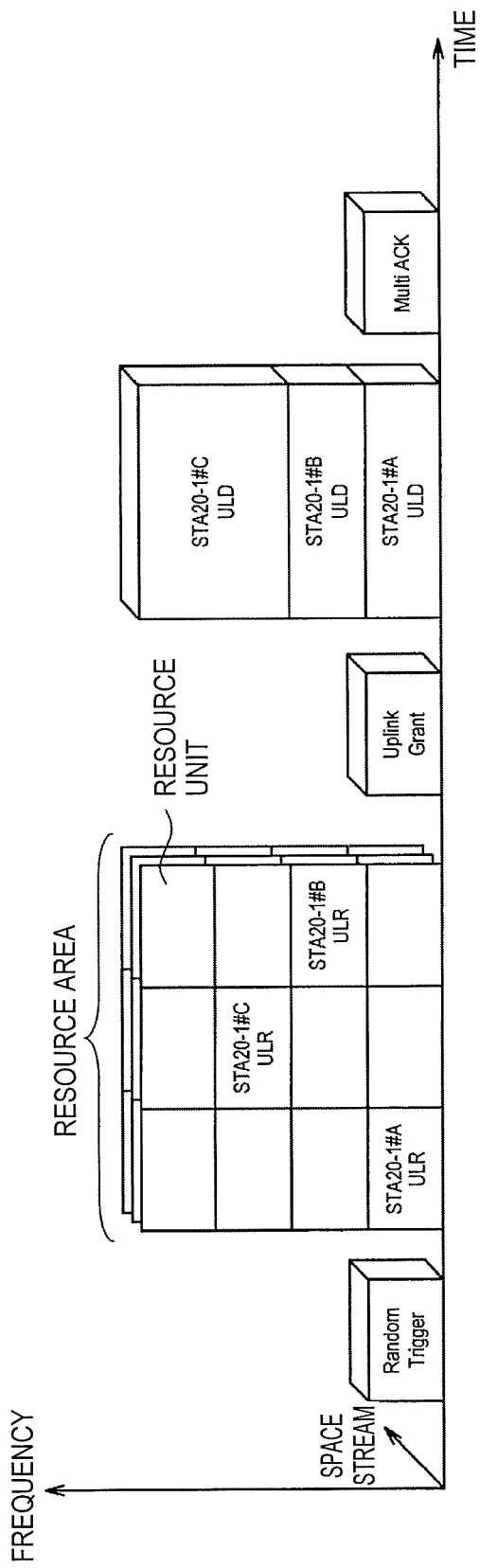
FIG. 6 is a diagram for describing another example of allocation and usage of resources in communication performed by an AP and an STA according to the present embodiment.

In this regard, the control unit 120 decides the resource unit and the resource area on the basis of attribute information related to transmission of a response UL frame (a response frame) serving as the response to the trigger frame which will be described later. Specifically, the control unit 120 decides the resource area on the basis of the attribute information of the STA 20-1 that transmits the response UL frame. The resource area decision process will be described in detail with reference to FIG. 6. FIG. 6 is a diagram for describing another example of allocation and usage of resources in communication performed by the AP 10-1, etc. according to the present embodiment.

The attribute information of the STA 20-1 that transmits the response UL frame includes information related to the presence or absence of an uplink communication request. Specifically, the uplink communication request is a data transmission request. For example, the control unit 120 first decides the STA 20-1 having the data transmission request as a UL transmission permission target. Then, in a case of causing the STA 20-1 to transmit the ULR frame using the resource unit, the control unit 120 decides the resource unit on the basis of the size of the ULR frame. Further, the control unit 120 decides the resource area on the basis of the estimated number of STAs 20-1 having the data transmission request and the size of the ULR frame (the size of the resource unit). For this reason, as illustrated in FIG. 6, the size of the resource area may be smaller than that of the resource area illustrated in FIG. 5. The number of STAs 20-1 having the data transmission request may be estimated on the basis of a result of communication with the STA 20-1 which has been performed at a previous point in time.

(Transmission of Trigger Frame)

The AP 10-1 notifies each of the STAs 20-1 of resources available for the UL transmission. Specifically, the AP 10-1 transmits a trigger frame (a first frame) including the resource information in which the resource unit selectable as the UL resources from the resource area is specified and the attribute information related to transmission of the response UL frame to the STA 20-1. More specifically, the control unit 120 decides the resource information and the attribute information of the STA 20-1 that transmits the response UL frame, and causes the data processing unit 110 to generate the trigger frame including the resource information and the attribute information. Then, the wireless communication unit 130 transmits the generated trigger frame.

Figure 7:
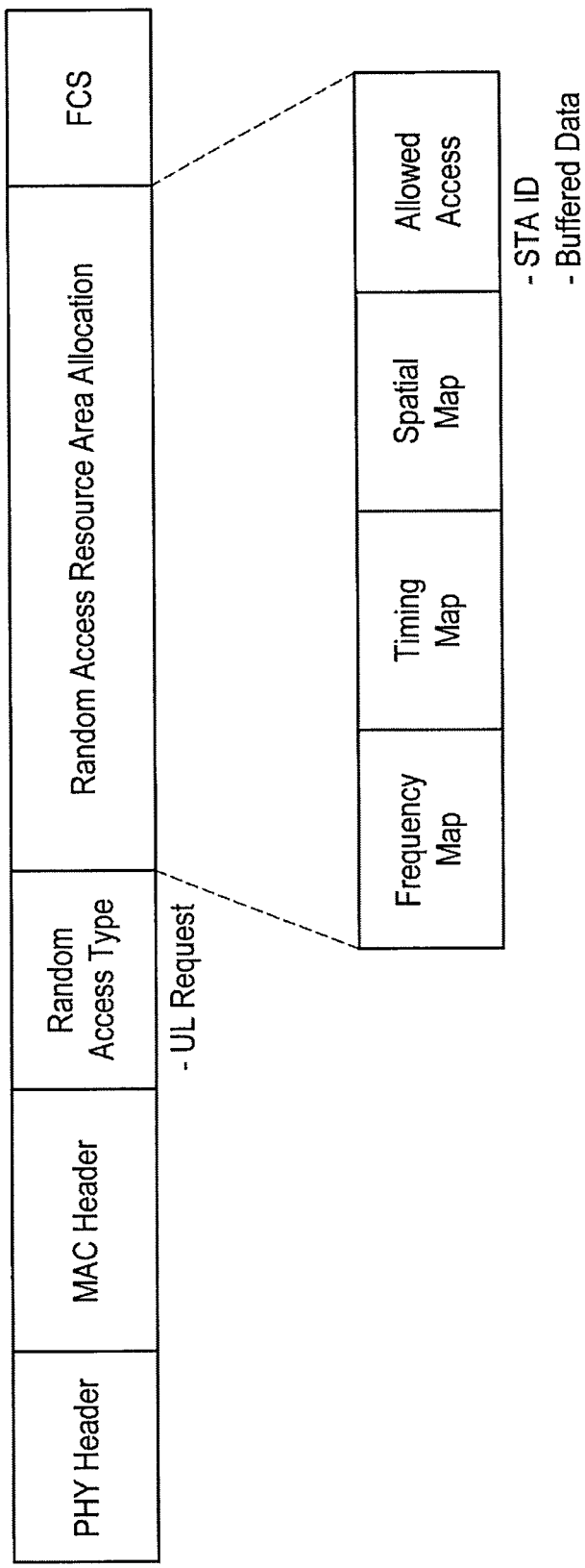
FIG. 7 is a diagram illustrating an example of a configuration of a trigger frame according to the present embodiment.

For example, the AP 10-1 transmits a random trigger frame illustrated in FIG. 6 as the trigger frame. In the example of FIG. 6, the random trigger frame is transmitted through a specific channel such as a primary channel, but the random trigger frame may be transmitted through any other channel or all available channels. The same applies to an uplink grant frame and a multi ACK frame which will be described later. The trigger frame may be transmitted at regular intervals like a beacon frame or may be transmitted at a known DL transmission timing. The trigger frame will be described in detail with reference to FIG. 7. FIG. 7 is a diagram illustrating an example of a configuration of the trigger frame according to the present embodiment.

The trigger frame includes fields such as a physical layer (PHY) header, a MAC header, a random access type, random access resource area allocation, and a frame check sequence (FCS) as illustrated in FIG. 7.

The random access type field stores the attribute information of the STA 20-1 that transmits the response UL frame, that is, the attribute information of the STA 20-1 serving as the UL transmission permission target. For example, the attribute of the STA 20-1 is the presence or absence of the ULR, and as the ULR, there is a communication connection request such as a probe request or an association request in addition to the data transmission request.

The random access resource area allocation field stores part of information serving as wireless communication resource information. For example, fields such as a frequency map, a timing map, a spatial map, and allowed access are included in this field as illustrated in FIG. 7.

Information in which a frequency allocated to the resource unit is specified, information in which a time allocated to the resource unit is specified, and information in which a space stream allocated to the resource unit is specified are stored in the frequency map field, the timing map field, and the spatial map field, respectively.

Information indicating information requested to be stored in the response

UL frame transmitted as the response to the trigger frame is stored in the allowed access field. For example, an STA ID in which the STA 20-1 transmitting the response UL frame is specified and buffered data information indicating the size of data whose UL transmission is scheduled may be stored in the allowed access field as illustrated in FIG. 7.

(Reception of Response Frame)

After transmitting the trigger frame, the AP 10-1 receives the response UL frame (a second frame) serving as the response to the trigger frame from the STA 20-1. Specifically, the AP 10-1 receives the response UL frame on the basis of the resource information included in the trigger frame. More specifically, the control unit 120 causes the wireless communication unit 130 to perform a reception setting so that it is on standby for reception within the range of the decided resource area after the trigger frame is transmitted. The response UL frame is transmitted using at least one resource unit selected from a group of resource units specified in the resource information. For example, the AP 10-1 performs the reception setting so that the frame is received through the entire resource area illustrated in FIG. 6, and receives the ULR frames transmitted from the STAs 20-1# A to 20-1# C using the selected resource units.

Further, the AP 10-1 acquires information (hereinafter, also referred to as "UL transmission schedule information") about content of scheduled UL transmission from the received response UL frame. Specifically, when the wireless communication unit 130 receives the response UL frame, the data processing unit 110 acquires the STA ID and the buffered data information included in the response UL frame. Then, the control unit 120 determines whether or not permission for data transmission of the data size indicated by the buffered data information is given to the STA 20-1 of the STA ID.

(Transmission of UL Transmission Permission Frame)

The AP 10-1 transmits a UL transmission permission frame to the STA 20-1 in response to the ULR notified of through the response UL frame. Specifically, in a case where the data transmission indicated by the information included in the response UL frame is determined to be permitted, the control unit 120 allocates UL transmission resources in accordance with the ULR to the STA 20-1. Then, the control unit 120 causes the data processing unit 110 to generate the UL transmission permission frame including information (hereinafter, also referred to as "resource allocation information") indicating the allocated UL transmission resources. After a predetermined period of time elapses from reception of the response UL frame, the wireless communication unit 130 transmits the generated UL transmission permission frame.

For example, the control unit 120 allocates the UL transmission resources in which the data transmission of the data size notified of through the response UL frame can be performed to the STAs 20-14A to 20-14C serving as a transmission source of the response UL frame. Then, the control unit 120 causes the data processing unit 110 to generate the uplink grant frame of FIG. 6 including the STA ID in which the data transmission is determined to be permitted and the resource allocation information indicating the allocated UL transmission resources. Then, the generated uplink grant frame is transmitted through the wireless communication unit 130.

Note that information corresponding to the STA 20-1 in which the data transmission is determined not to be permitted among the STAs 20-1 that have transmitted the response UL frame may not be included in the UL transmission permission frame, and information indicating that there are no allocated transmission resources may be included instead.

(Reception of Data Frame and Transmission of Confirmation Response Frame)

After transmitting the UL transmission permission frame, the AP 10-1 receives the data frame from the STA 20-1. Specifically, the control unit 120 causes the wireless communication unit 130 to perform the reception setting so that the frame is received through resources of which the STA 20-1 is notified through the UL transmission permission frame. Then, the wireless communication unit 130 receives the data frame transmitted through the resources that are notified of. For example, the data (ULD) frame may be transmitted from each of the STAs 20-1#A to 20-1#C and undergo the frequency division multiplexing as illustrated in FIG. 6. The ULD frame may undergo the space division multiplexing instead of or in addition to the frequency division multiplexing.

Further, upon receiving the data frame, the AP 10-1 transmits a confirmation response frame to the data frame to the STA 20-1. Specifically, when the data frame is received through the wireless communication unit 130, after a predetermined period of time elapses, the control unit 120 causes the data processing unit 110 to generate the confirmation response frame to the data frame. Then, the generated confirmation response frame is transmitted through the wireless communication unit 130. For example, the confirmation response frame may be a multi ACK frame in which confirmation response information (hereinafter, also referred to as "ACK information") to each of a plurality of data frames is stored.

((Functions of STA))

Next, characteristic functions of the STA 20-1 will be described.

(Reception of Trigger Frame)

The STA 20-1 receives the trigger frame from the AP 10-1. Specifically, when the trigger frame is received through the wireless communication unit 130, the data processing unit 110 acquires the resource information included in the trigger frame and the attribute information related to transmission of the response UL frame.

Further, the control unit 120 determines whether or not the response UL frame is transmitted using resources selected from the selectable resources specified in the resource information on the basis of the attribute information related to transmission of the response UL frame. Specifically, the control unit 120 determines whether or not the attribute information of its own apparatus corresponds to the attribute information of the transmission apparatus. For example, in a case where the information stored in the random access type field of the trigger frame indicates the STA 20-1 having the ULR, the control unit 120 determines whether or not its own apparatus has the ULR.

(Selection of Resource Unit)

The STA 20-1 decides resources used for the UL transmission on the basis of the resource information included in the trigger frame. Specifically, in a case where the UL transmission is determined to be performed, the control unit 120 randomly selects the resource unit from the resource area (a group of resource units) specified in the resource information. For example, the control unit 120 selects the resource unit by selecting the frequency, the time, and the space stream from the information stored in the frequency map, the timing map, and the spatial map included in the random access resource area allocation field of the trigger frame. For example, as illustrated in FIG. 6, the STA 20-1#A selects a lower left resource unit among a group of 12 resource units obtained by dividing the resource area. The example in which the control unit 120 randomly selects the resource unit has been described above, but the resource unit may be selected according to a specific rule.

(Transmission of Response Frame)

The STA 20-1 transmits the response UL frame serving as the response to the trigger frame to the AP 10-1 using the decided resources. Specifically, the control unit 120 causes the data processing unit 110 to generate the ULR frame including information related to content of the uplink communication request after the resource unit is selected. The control unit 120 causes the wireless communication unit 130 to set a transmission setting so that the frame transmission can be performed using the selected resource unit. Then, the wireless communication unit 130 transmits the generated ULR frame in accordance with the transmission setting. For example, the STA ID of its own apparatus and the buffered data information indicating the size of the ULD are included in the ULR frame as the information indicating the information requested to be stored in the ULR frame.

(Reception of UL Transmission Permission Frame)

After the transmission of the response UL frame, the STA 20-1 receives the UL transmission permission frame from the AP 10-1. Specifically, when the UL transmission permission frame is received by the wireless communication unit 130, the data processing unit 110 acquires the resource allocation information from the UL transmission permission frame. Then, the control unit 120 determines the presence or absence of transmission of the data frame on the basis of the acquired resource allocation information. For example, in a case where the STA ID of its own apparatus is included in the resource allocation information, the control unit 120 determines the data frame to be transmitted.

(Transmission of Data Frame and Reception of Confirmation Response Frame)

The STA 20-1 transmits the data frame on the basis of the resource allocation information. Specifically, in a case where the data frame is determined to be transmitted, the control unit 120 causes the data processing unit 110 to generate the data frame, and causes the wireless communication unit 130 to perform the transmission setting so that the data frame can be transmitted using the resources indicated by the resource allocation information. Then, the wireless communication unit 130 transmits the generated data frame after a predetermined period of time elapses from reception of the UL transmission permission frame. For example, each of the STAs 20-1#A to 20-1#C transmits the ULD frame using the allocated resources. As a result, as illustrated in FIG. 6, the ULD frame is multiplexed. The size of the allocated resources differs in accordance with the data size that is transmitted through the ULD frame, and, for example as illustrated in FIG. 6, resources of the same size are allocated to the STAs 20-1#A and 20-1#B, but resources of a different size are allocated to the STA 20-1#C.

Further, after transmitting the data frame, the STA 20-1 receives the confirmation response frame as the response to the data frame. Specifically, the wireless communication unit 130 receives the confirmation response frame to the data frame after a predetermined period of time elapses from the transmission of the data frame. The confirmation response frame may be the multi ACK frame including the ACK information addressed to a plurality of STAs 20-1. In this case, the control unit 120 determines the presence or absence of the ACK information addressed to its own apparatus, and performs a retransmission process of the ULD frame in a case where the ACK information addressed to its own apparatus is determined not to be included.

2-3. Processes of Apparatuses

Next, processes of the AP 10-1 and the STA 20-1 according to the present embodiment will be described. A description of processes that are substantially the same as the above-described processes is omitted.

(Process of AP)

Figure 8:
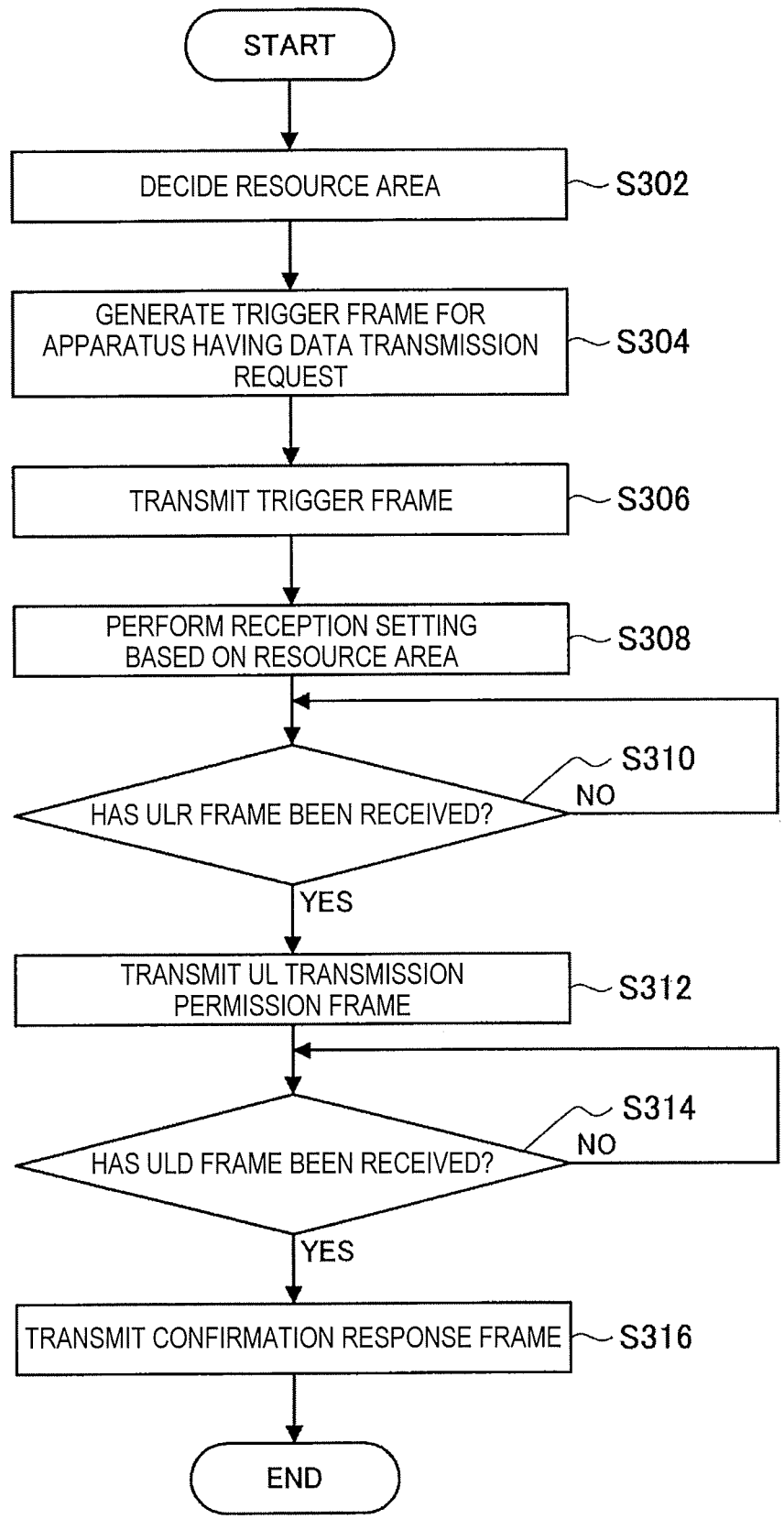
FIG. 8 is a flowchart conceptually illustrating a process of an AP according to the present embodiment.

First, a process of the AP 10-1 according to the present embodiment will be described with reference to FIG. 8. FIG. 8 is a flowchart conceptually illustrating a process of the AP 10-1 according to the present embodiment.

The AP 10-1 decides the resource area (step S302). Specifically, the control unit 120 decides the attribute information of the STA 20-1 serving as a transmission target of the response UL frame, and decides the size of the resource unit on the basis of the decided attribute information, that is, content of the UL transmission. Then, the control unit 120 decides the resource area available for the UL transmission on the basis of the estimated number of STAs 20-1 corresponding to the attribute information and the size of the resource unit.

Then, the AP 10-1 generates the trigger frame for the apparatus having the data transmission request (step S304). Specifically, the control unit 120 sets only the STAs 20-1 having the ULR as a response target, and causes the data processing unit 110 to generate the trigger frame including the resource information in which the decided resource unit is specified.

Then, the AP 10-1 transmits the trigger frame to the STA 20-1 (step S306). Specifically, the wireless communication unit 130 transmits the generated trigger frame to each of the STAs 20-1.

Then, the AP 10-1 performs the reception setting on the basis of the resource area (step S308). Specifically, the control unit 120 causes the wireless communication unit 130 to perform the reception setting so that the ULR frame is received within the decided resource area.

Then, the AP 10-1 is on standby until the ULR frame is received (step S310). Specifically, the wireless communication unit 130 is on standby without changing the set communication parameter until the ULR frame is received.

Upon receiving the ULR frame, the AP 10-1 transmits the UL transmission permission frame to the STA 20-1 (step S312). Specifically, when the ULR frame is received by the wireless communication unit 130, the data processing unit 110 acquires the UL transmission schedule information included in the ULR frame. Then, the control unit 120 allocates resources to the transmission source of the ULR frame on the basis of the UL transmission schedule information, and generates the resource allocation information. Then, the control unit 120 causes the data processing unit 110 to generate the UL transmission permission frame including the resource allocation information, and the generated UL transmission permission frame is transmitted through the wireless communication unit 130.

Then, the AP 10-1 is on standby until the ULD frame is received (step S314). Specifically, the control unit 120 causes the wireless communication unit 130 to perform the reception setting on the basis of the resource allocation information so that the ULD frame is received.

Upon receiving the ULD frame, the AP 10-1 transmits the confirmation response frame to the STA 20-1 (step S316). Specifically, when the ULD frame is received by the wireless communication unit 130, the control unit 120 causes the data processing unit 110 to generate the confirmation response frame to the ULD frame, and the generated confirmation response frame is transmitted through the wireless communication unit 130. Note that, in a case where no ULD frame is received, the confirmation response frame is not transmitted.

(Process of STA)

Figure 9:
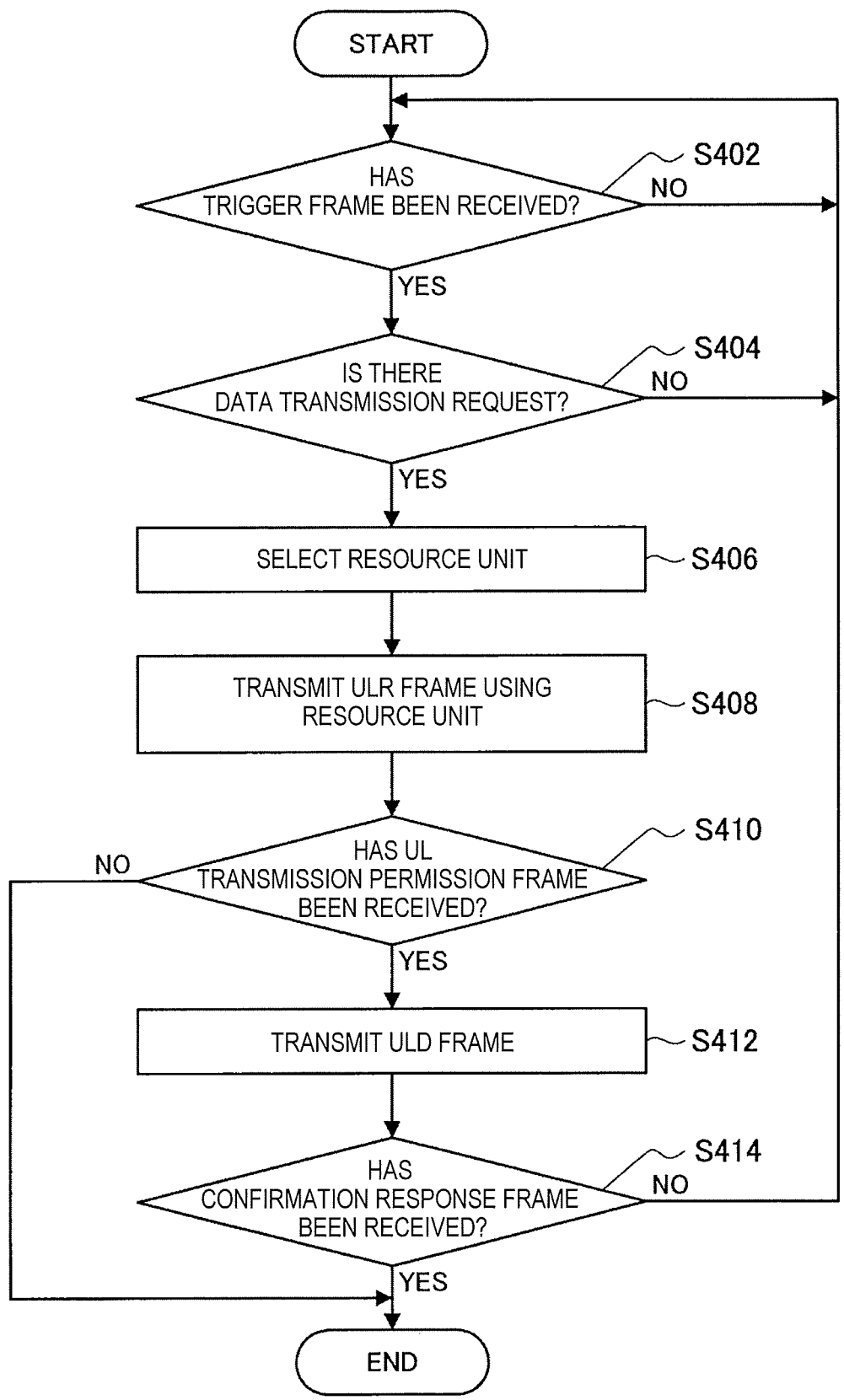
FIG. 9 is a flowchart conceptually illustrating a process of an STA according to the present embodiment.

Next, a process of the STA 20-1 according to the present embodiment will be described with reference to FIG. 9. FIG. 9 is a flowchart conceptually illustrating a process of the STA 20-1 according to the present embodiment.

The STA 20-1 is on standby for reception of the trigger frame (step S402). Specifically, when a transmission timing of the trigger frame arrives, the control unit 120 causes the wireless communication unit 130 to be on standby for reception of the trigger frame.

Upon receiving the trigger frame, the STA 20-1 determines whether or not its own apparatus has the data transmission request (step S404). Specifically, when the trigger frame is received by the wireless communication unit 130, the data processing unit 110 acquires the resource information included in the trigger frame and the attribute information of the STA 20-1 serving as the UL transmission target. Then, in a case where an attribute indicated by the attribute information indicates that there is the data transmission request, the control unit 120 determines whether or not its own apparatus has the data transmission request. For example, the control unit 120 performs the determination on the basis of the presence or absence of data in the transmission buffer 112.

When its own apparatus is determined to have the data transmission request, the STA 20-1 selects the resource unit (step S406). Specifically, when its own apparatus is determined to have the data transmission request, the control unit 120 selects the resource unit on the basis of the resource information acquired from the trigger frame.

Then, the STA 20-1 transmits the ULR frame to the AP 10-1 using the resource unit (step S408). Specifically, the control unit 120 causes the wireless communication unit 130 to perform the transmission setting on the basis of the selected resource unit. The control unit 120 causes the data processing unit 110 to generate the ULR frame including the UL transmission schedule information. Then, the generated ULR frame is transmitted through the wireless communication unit 130.

Then, the STA 20-1 determines whether or not the UL transmission permission frame has been received (step S410). Specifically, the control unit 120 determines whether or not the UL transmission permission frame has been received within a predetermined period of time from the transmission of the ULR frame. When the UL transmission permission frame is determined not to have been received within the predetermined period of time, the control unit 120 regards the UL transmission as not being permitted, and ends the process.

Upon receiving the UL transmission permission frame, the STA 20-1 transmits the ULD frame to the AP 10-1 (step S412). Specifically, when the UL transmission permission frame is received by the wireless communication unit 130, the data processing unit 110 acquires the resource allocation information that is included in the UL transmission permission frame and addressed to its own apparatus.

Then, the control unit 120 causes the wireless communication unit 130 to perform the transmission setting on the basis of the acquired resource allocation information. The control unit 120 causes the data processing unit 110 to generate the ULD frame. Then, the generated ULD frame is transmitted through the wireless communication unit 130.

Then, the STA 20-1 determines whether or not the confirmation response frame has been received (step S414). Specifically, the control unit 120 determines whether or not the confirmation response frame has been received within a predetermined period of time from the transmission of the ULD frame. When the confirmation response frame is determined not to have been received within the predetermined period of time, the control unit 120 regards the transmission of the ULD frame as having failed, and causes the process to return to step S402. In a case where the confirmation response frame has been received within the predetermined period of time, the process ends.

2-4. Conclusion of First Embodiment

As described above, according to the first embodiment of the present disclosure, the AP 10-1 transmits the first frame including the resource information in which resources selectable as uplink resources from a plurality of resources are specified and the attribute information related to transmission of the second frame, and receives the response frame transmitted as the response to the first frame. The STA 20-1 transmits the first frame including the resource information in which resources selectable as uplink resources from a plurality of resources are specified and the attribute information related to transmission of the response frame, and transmits the second frame as the response to the first frame. For this reason, only transmission of a specific response UL frame is performed on the basis of the attribute information, and thus resources used for the response UL frame transmitted in the UL communication of the random access scheme are reduced. As a result, a possibility that frame collision will occur is lower than in a case where an arbitrary STA 20-1 transmits the UL frame, and it is possible to suppress a decrease in the communication efficiency of the UL communication of the random access scheme.

Further, the AP 10-1 receives the second frame on the basis of the resource information included in the first frame. Thus, the reception setting is performed in accordance with the transmission parameter of the response UL frame, and thus certainty of reception of the response UL frame can be improved.

Further, the second frame is transmitted using at least one resource selected from the selectable resources specified in the resource information on the basis of the attribute information related to the transmission of the second frame. Thus, the response UL frame is transmitted within the range of the selected resource unit, and thus it is possible to reduce the possibility that the resources of the response UL frames will overlap and more reliably reduce the possibility that the UL frames will collide.

Further, the attribute information related to the transmission of the second frame includes the attribute information of the transmission apparatus performing the transmission of the second frame, and the STA 20-1 transmits the second frame in a case where the attribute information of its own apparatus corresponds to the attribute information of the transmission apparatus. Thus, by suppressing the number of STAs 20-1 performing the UL transmission, it is possible to more reliably reduce the collision rate of the transmitted UL frame.

Further, the attribute information of the transmission apparatus includes the information related to the uplink communication request. Thus, the resource unit is prepared in accordance with the number of STAs 20-1 having the ULR, and the resource units (the resource area) can be appropriately secured.

Further, the uplink communication request includes the data transmission request. For this reason, it is possible to more effectively suppress the frame collision by applying the configuration according to the present embodiment to the data frame whose frame length varies in accordance with each STA 20-1 more easily than other UL frames.

Further, the uplink communication request includes the communication connection request. Thus, it is possible to prevent a situation in which a communication connection is not established for a long time due to collision of frames related to the data connection request.

Further, the second frame includes the information related to content of the uplink communication request. Thus, it is possible to perform an appropriate response to the ULR. Particularly, in a case where the ULR is the data transmission request, the resources are appropriately allocated to the transmission of the ULD frame, and thus a reception success rate of the ULD frame and the resource use efficiency can be improved.

2-5. Modified Examples

The first embodiment of the present disclosure has been described above. The present embodiment is not limited to the above example. Next, first and second modified examples of the present embodiment will be described.

First Modified Example

Figure 10:
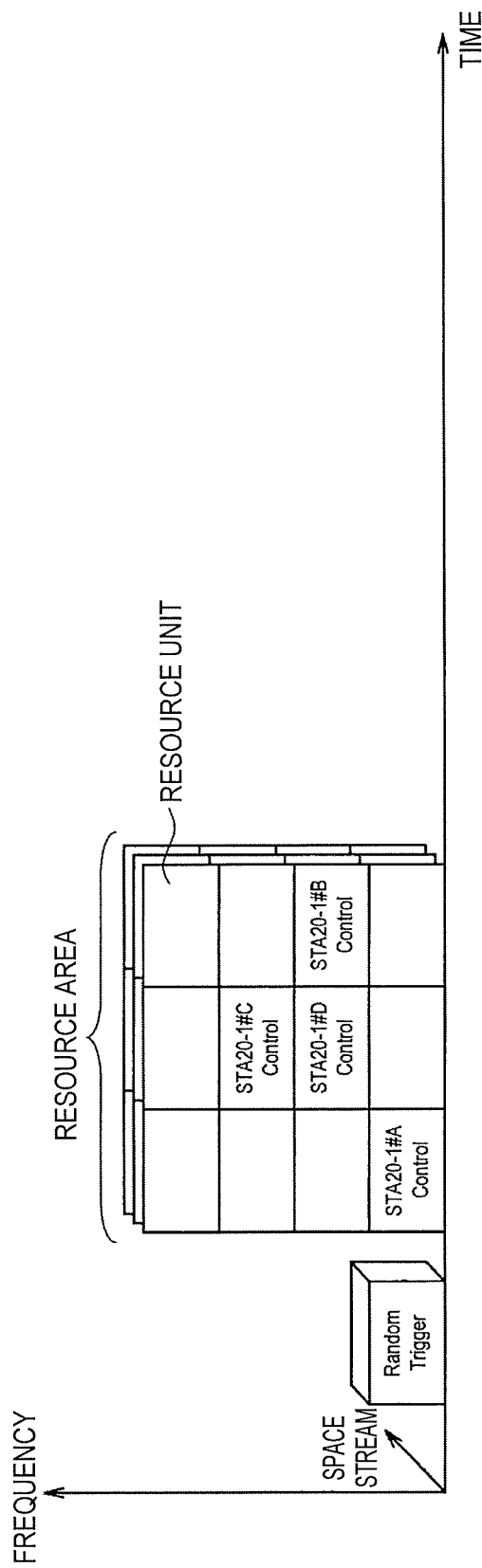
FIG. 10 is a diagram for describing an example of allocation and usage of resources in communication performed by an AP and an STA according to a first modified example of the present embodiment.

As the first modified example of the present embodiment, the AP 10-1 may give the UL transmission permission only to the STA 20-1 that transmits a specific response UL frame. Specifically, the attribute information related to the transmission of the response UL frame includes information (hereinafter, also referred to as "frame attribute information") related to an attribute of the response UL frame. More specifically, the attribute of the response UL frame includes a type (format) of frame. For example, the AP 10-1 transmits the trigger frame including the frame attribute information of the response UL frame to the STA 20-1, and only the STA 20-1 that is scheduled to transmit a frame having an attribute indicated by the frame attribute information transmits the response UL frame of the attribute. A process according to the present modified example will be described in detail with reference to FIG. 10. FIG. 10 is a diagram for describing an example of allocation and usage of resources in communication performed by the AP 10-1, etc. according to the first modified example of the present embodiment.

First, the AP 10-1 decides an attribute of a frame whose UL transmission is permitted. Specifically, the control unit 120 decides a type of frame to be transmitted as the response UL frame. For example, the type of frame may be a type of MAC frame such as a control frame, a management frame, or a data frame. The type of frame may be any other type defined in a standard or may be a type that is defined uniquely.

Then, the AP 10-1 decides the resource area on the basis of the decided attribute of the frame. For example, the control unit 120 decides the resource unit on the basis of the size of the frame specified from the decided type of frame. The control unit 120 decides the resource area on the basis of the estimated number of transmissions of the corresponding type of frame and the size of the resource unit.

Then, the AP 10-1 transmits the trigger frame including the resource information and the frame attribute information to the STA 20-1. For example, the control unit 120 causes the data processing unit 110 to generate the trigger frame including the resource information in which a group of decided resource units is specified and the frame attribute information. Then, the generated trigger frame is transmitted through the wireless communication unit 130.

The STA 20-1 that has received the trigger frame determines the presence or absence of the transmission of the response UL frame on the basis of the frame attribute information. Specifically, the control unit 120 determines whether or not the attribute of the UL frame that is scheduled to be transmitted corresponds to the attribute of the response UL frame. For example, in a case where the type of frame indicated by the frame attribute information is the control frame, the control unit 120 determines whether or not a type of UL frame that is scheduled to be transmitted is the control frame.

In a case where the response UL frame is determined to be transmitted, the STA 20-1 transmits the response UL frame to the AP 10-1 using the resource unit selected from the resource information. For example, in a case where the type of UL frame that is scheduled to be transmitted is determined to be the control frame, the control unit 120 randomly selects the resource unit from a group of resource units specified in the resource information. Then, the control unit 120 causes the wireless communication unit 130 to perform the transmission setting on the basis of the selected resource unit, and causes the data processing unit 110 to generate the control frame serving as the response UL frame. Then, the generated control frame is transmitted through the wireless communication unit 130. As a result, for example as illustrated in FIG. 10, the control frame is transmitted from each of the STAs 20-1#A to 20-1#D. In the example of FIG. 10, the control frame transmitted from the STA 20-1#C and the control frame transmitted from the STA 20-14D undergo the frequency division multiplexing.

Figure 11:
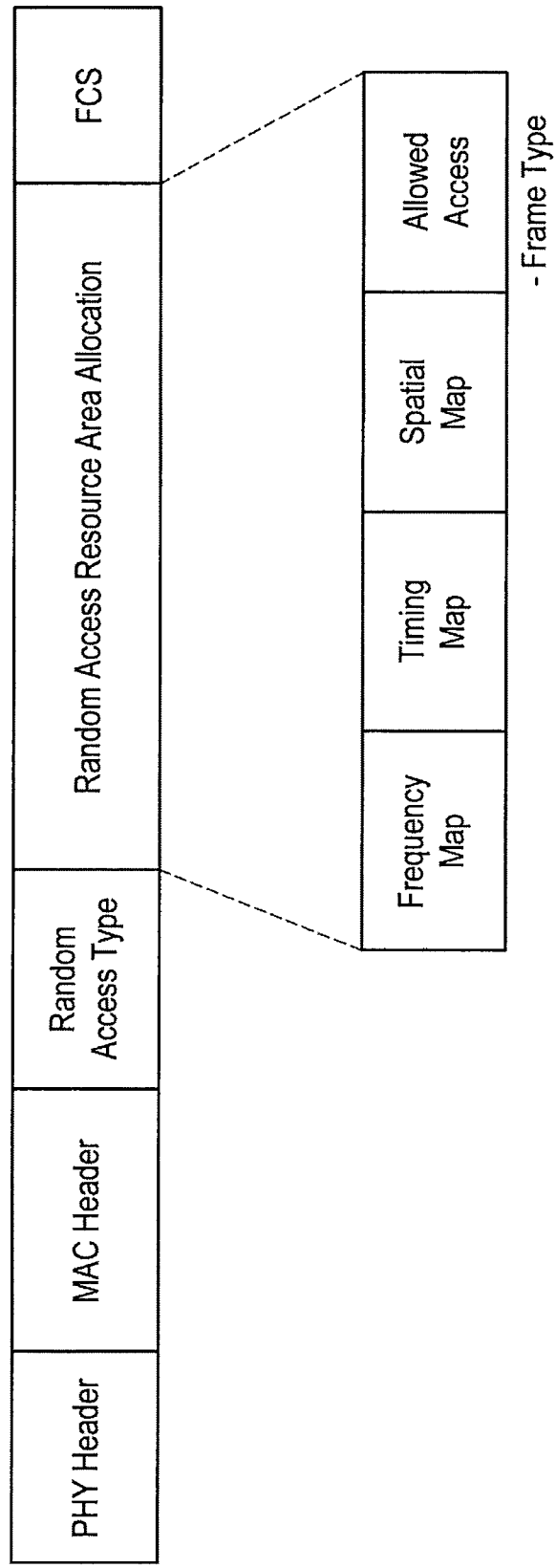
FIG. 11 is a diagram illustrating an example of a configuration of a trigger frame according to the first modified example of the present embodiment.

Moreover, the trigger frame that is transmitted according to the present modified example will be described in detail with reference to FIG. 11. FIG. 11 is a diagram illustrating an example of a configuration of the trigger frame according to the first modified example of the present embodiment.

The trigger frame has substantially the same field configuration as the trigger frame according to the first embodiment, but information stored in some fields differs as illustrated in FIG. 11.

Information (the frame attribute information) indicating an attribute of the response UL frame serving as the response to the trigger frame is stored in the allowed access field. For example, information frame type indicating a type of frame may be stored in the allowed access field as illustrated in FIG. 11.

Note that no data or information indicating that a frame corresponding to the frame attribute information stored in the allowed access field is the UL transmission target is stored in the random access type field.

As described above, according to the first modified example of the present embodiment, the attribute information related to the transmission of the second frame includes information related to the attribute of the second frame. The STA 20-1 transmits the frame in which the attribute of the frame corresponds to the attribute of the second frame as the second frame. Thus, only a frame of a specific attribute is transmitted within the resource area, and so the number of transmitted UL frames is suppressed, and the collision rate of the UL frame can be reduced more reliably.

Further, the attribute of the second frame includes a type of frame. Thus, the size of the frame is roughly specified in accordance with a type of frame, and so the size of the resource unit, that is, the resources secured for the UL transmission, can be appropriately adjusted, and the resource use efficiency can be improved.

Second Modified Example

As the second modified example of the present embodiment, the AP 10-1 may collect information of the other STAs 20-1 using the trigger frame instead of or in addition to the above-described information related to UL transmission traffic of the STA 20-1. Specifically, the attribute information of the STA 20-1 that transmits the response UL frame which is included in the trigger frame includes information related to a communication state of the STA 20-1. As the information related to the communication state of the STA 20-1, there is information related to communication quality.

For example, the AP 10-1 stores a threshold value of a packet error rate (PER) in the random access type field of the trigger frame as the attribute information of the STA 20-1 that transmits the response UL frame. Then, the AP 10-1 transmits the trigger frame to the STA 20-1.

The STA 20-1 that has received the trigger frame determines whether or not the PER of its own apparatus is equal to or higher than the threshold value of the PER included in the trigger frame. In a case where the PER is determined to be equal to or higher than the threshold value, the STA 20-1 randomly selects the resource unit from a group of resource units specified in the resource information included in the trigger frame. Then, the STA 20-1 transmits the response UL frame including the information indicating the STA ID of its own apparatus using the selected resource unit. The STA 20-1 may transmit the response UL frame including the PER of its own apparatus.

Further, as the information related to the communication state of the STA 20-1, there is information related to a state of a communication channel.

For example, the AP 10-1 stores a predetermined value of an index included in a channel state information (CSI) report in the random access type field of the trigger frame as the frame attribute information of the response UL frame. Then, the AP 10-1 transmits the trigger frame to the STA 20-1.

The STA 20-1 that has received the trigger frame determines whether or not a value of an index included in the CSI report of its own apparatus satisfies a condition for the predetermined value included in the trigger frame. In a case where the condition is determined to be satisfied, the STA 20-1 randomly selects the resource unit from a group of resource units specified in the resource information included in the trigger frame. Then, the STA 20-1 transmits the response UL frame including the information indicating the STA ID of its own apparatus and the CSI report using the selected resource unit.

Note that the response UL frame may include information different from information related to the communication state serving as the transmission condition of the response UL frame. For example, information indicating a received signal strength indicator (RSSI) or the like may be included in the response UL frame including the PER.

As described above, according to the second modified example of the present embodiment, the attribute information of the transmission apparatus performing the transmission of the second frame includes information related to the communication state of the transmission apparatus. Thus, the incidence of the frame collision in the transmission of the information related to the communication state of the STA 20-1 is suppressed, and the information can be efficiently collected.

Further, the communication state includes the information related to the communication quality. Thus, the information related to the communication quality is efficiently collected, and the communication quality can be improved sooner, and the communication efficiency can be improved. Particularly, in multicast communication, by specifying the STA 20-1 whose communication quality is lower than an expected quality and setting a multicast transmission parameter, a multicast group, or the like on the basis of the STA 20-1, the communication quality is improved. Thus, it is desirable to specify the STA 20-1 whose communication quality is lower than an expected quality as soon as possible. On the other hand, according to the configuration of the present modified example, the communication quality of the multicast communication can be improved early on.

Further, the communication state includes the information related to the state of the communication channel. Thus, the information related to the state of the communication channel is efficiently collected, the communication parameter in accordance with the state of the communication channel is set sooner, and the communication quality and the communication efficiency can be improved.

Further, the second frame includes information related to content of the communication state of the transmission apparatus. Thus, compared to a case where only the presence or absence of the attribute information serving as the UL transmission target is detected on the basis of the presence or absence of reception of the response UL frame, an amount of information is increased, and thus the AP 10-1 can take various actions in order to improve the communication state.

3. SECOND EMBODIMENT (COLLECTION OF INFORMATION RELATED TO THE UL TRANSMISSION USING SUB AREA)

The AP 10-1 and the STA 20-1 according to the first embodiment of the present disclosure have been described above. Next, an AP 10-2 and an STA 20-2 (hereinafter, also referred to as an "AP 10-2, etc.") according to the second embodiment of the present disclosure will be described.

3-1. Configurations of Apparatuses

A configuration of the AP 10-2, etc. according to a second embodiment of the present disclosure is substantially the same as the configuration of the AP 10-1, etc. according to the first embodiment, and thus a description thereof is omitted.

3-2. Technical Features

Characteristic functions of the AP 10-2 and the STA 20-2 according to the second embodiment of the present disclosure will be described. The present embodiment will be described in connection with an example in which the ULR frame is transmitted as the response to the trigger frame, and the confirmation response frame to the ULR frame is transmitted.

((Functions of AP))

First, characteristic functions of the AP 10-2 will be described.

(Decision of Resource Area)

Figure 12:
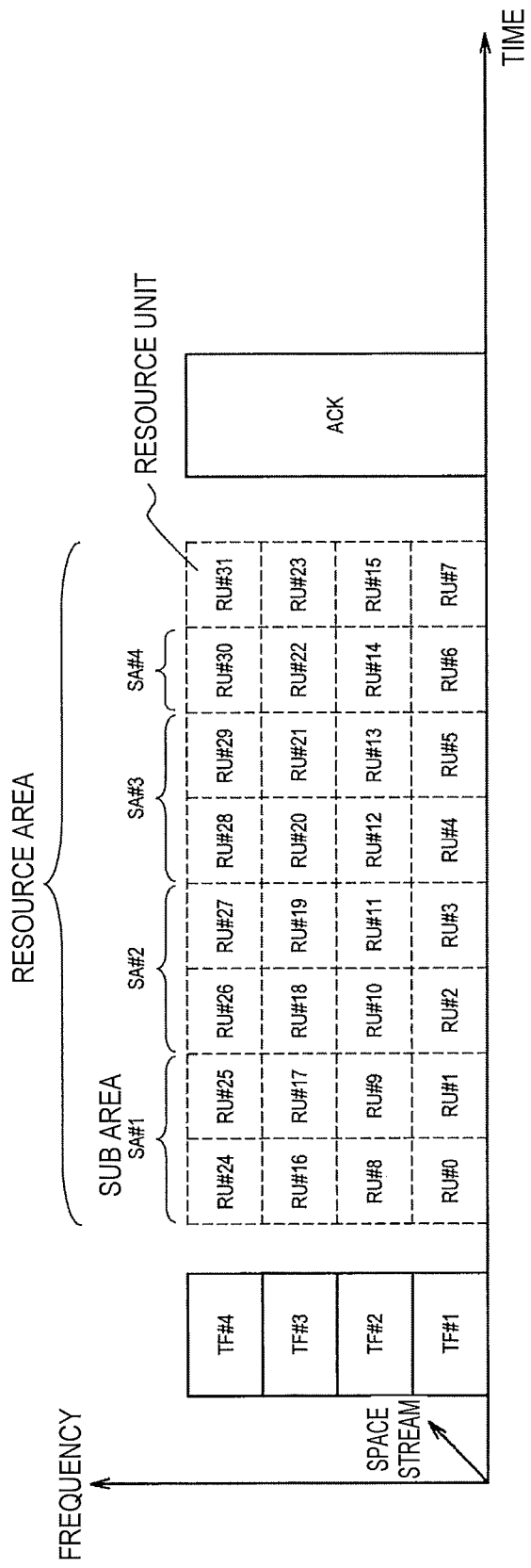
FIG. 12 is a diagram for describing an example of resource allocation in communication performed by an AP and an STA according to a second embodiment of the present disclosure.

The AP 10-2 decides the resource area on the basis of resources available for the UL transmission. Specifically, the control unit 120 decides the resource area on the basis of a frequency bandwidth and a space stream available during a UL transmission period of time. Then, the control unit 120 decides the resource unit on the basis of the decided resource area and the size of the ULR frame. A resource area decision process according to the present embodiment will be described in detail with reference to FIG. 12. FIG. 12 is a diagram for describing an example of resource allocation in communication performed by the AP 10-2, etc. according to the present embodiment. In FIG. 12, an example in which the resource unit is configured with the time and the frequency is illustrated, but the resource unit may be divided in accordance with at least two of the time, the frequency, and the space stream.

First, the control unit 120 decides the resource area available for the UL transmission. For example, resources having a range illustrated in FIG. 12 are secured as the resource area.

Then, the control unit 120 decides the size of the resource unit on the basis of the size of the ULR frame. For example, the control unit 120 decides resources of the size corresponding to the size of the ULR frame as the resource unit. The size of the resource unit may be larger than the size of the ULR frame.

Then, the control unit 120 decides the resource area on the basis of the size of the resource unit and the number of STAs 20-2. Specifically, the control unit 120 decides the number of resource units on the basis of the number of connected STAs 20-2, and decides the resource area on the basis of the number of decided resource units and the size of the resource unit. For example, the control unit 120 decides the resource area so that 32 resource units RU #0 to RU #31 illustrated in FIG. 12 are included. A part of the resource area may not be used as the resource unit.

Note that some of the resources available for the UL transmission may be decided as the resource area. The resource area may be decided in accordance with the number of sub areas of the resource area which will be described later The size of the ULR frame may be fixed or variable as described above in the first embodiment. In this case, the process of deciding the size of the resource unit is not performed.

(Decision of Sub Area)

The AP 10-2 decides the sub area that is at least a part of the resource area. Specifically, the control unit 120 decides the sub area on the basis of information (hereinafter, also referred to as a "transmission setting condition") associated with the transmission of the UL frame related to the response UL frame. More specifically, the control unit 120 acquires the transmission setting condition, and decides the size of resources corresponding to the acquired transmission setting condition. Then, the control unit 120 decides a group of resource units in the resource area corresponding to the decided size of resources as the sub area.

Note that the sub area is decided in accordance with the number of transmission setting conditions, and thus there may be a plurality of sub areas.

Since the size of the sub area decided in accordance with the size of resources corresponding to the transmission setting condition, there may be a size difference between the sub areas. For example, as illustrated in FIG. 12, a plurality of sub areas SA #1 to #4 are set to the resource area, and the sizes of the sub areas SA #1 to #3 are different from the size of the sub area SA #4. In FIG. 12, an example in which the sub area is decided as a vertically long rectangle is illustrated, but it will be appreciated that the sub area may be decided as a horizontally long rectangle or any other polygon. The sub area may be decided so that the resource unit belonging to the sub area becomes a detached area.

Further, the transmission setting condition may be a condition related to the attribute of the UL frame. Specifically, as the attribute of the UL frame, there is a type of frame or a size of data for the UL frame. For example, as the type of frame, there is a type of MAC frame such as a control frame such as power save polling, a management frame such as a probe request, or a data frame. The type of frame may be any other type defined in a standard or may be a type that is defined uniquely, similarly to the first embodiment. The size of data may be indicated by a data length, a range of a data length, an index corresponding thereto, or the like.

Further, the transmission setting condition may be a condition related to redundancy of communication of the UL frame. Specifically, as the information related to the redundancy of communication, there is a condition including at least one of a modulation scheme and a coding rate. For example, as an element of a condition related to the redundancy of communication, there is a modulation and coding scheme (MCS).

Further, the transmission setting condition may be a condition related to the communication state of the transmission apparatus of the UL frame. Specifically, as the condition related to the communication state of the transmission apparatus, there is a condition related to radio wave propagation characteristics. For example, as the condition related to the radio wave propagation characteristics, there is a condition related to the RSSI or a received field strength. The condition related to the radio wave propagation characteristics may be a condition related to the PER or a bit error rate (BER) instead of or in addition to the RSSI.

(Transmission of Trigger Frame)

The AP 10-2 notifies each of the STAs 20-2 of information about the decided sub area. Specifically, the AP 10-2 transmits a trigger frame including information (hereinafter, also referred to as "sub area information") in which the sub area is specified from the resource area including the resource unit selectable as the UL resources. More specifically, the control unit 120 decides the sub area information, and causes the data processing unit 110 to generate the trigger frame including the sub area information. Then, the wireless communication unit 130 transmits the generated trigger frame. The trigger frame is transmitted for each channel serving as a channel bonding target. Thus, the STA 20-2 that has received the trigger frame can detect the channel serving as the channel bonding target usable by its own apparatus.

For example, the AP 10-2 transmits trigger frames TF #1 to TF #4 illustrated in FIG. 12 as the trigger frame using four channels serving as the channel bonding target. The TF is transmitted even through a channel other than the primary channel so that the TF is received even by the STA 20-2 that does not support channel bonding. For example, the TFs are subject to the frequency division multiplexing in units of predetermined bandwidths, for example, in units of 20 MHz and transmitted through all available channels.

Figure 13:
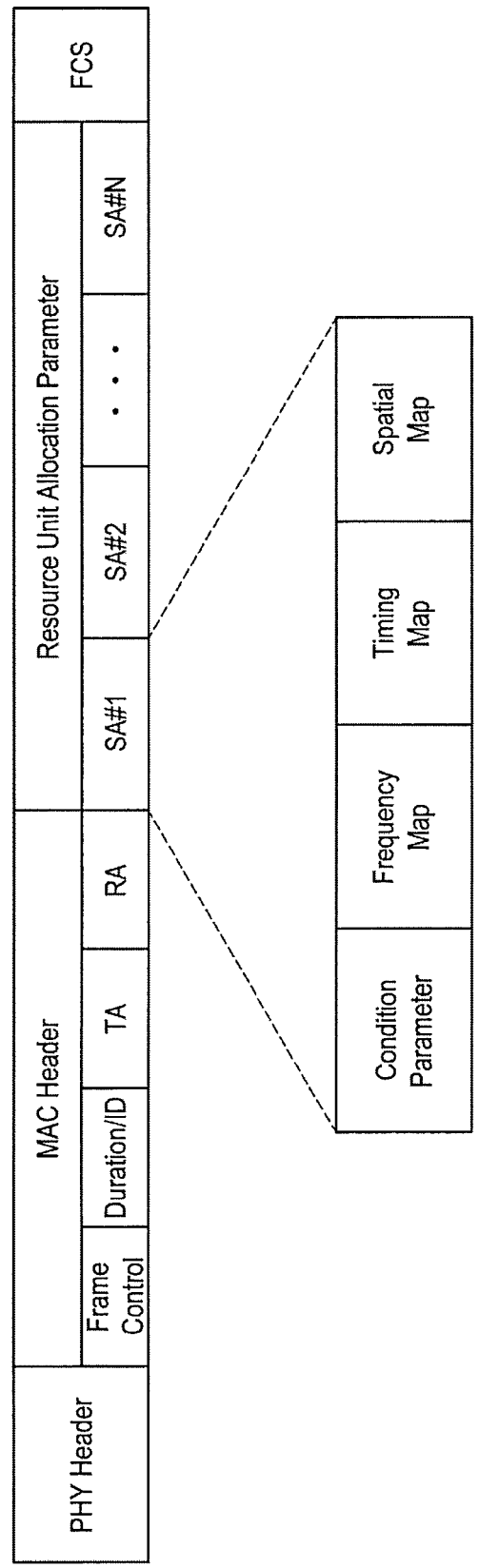
FIG. 13 is a diagram illustrating an example of a configuration of a trigger frame according to the present embodiment.

Note that in FIG. 12, the example in which the TFs are transmitted through all available channels is illustrated, but the TFs may be transmitted through a specific channel among available channels. The TFs may be aggregated or may be a multicast frame. The trigger frame may be transmitted at regular intervals like a beacon frame or may be transmitted at a known DL transmission timing. The trigger frame to be transmitted according to the present embodiment will be described in detail with reference to FIG. 13. FIG. 13 is a diagram illustrating an example of a configuration of the trigger frame according to the present embodiment.

The trigger frame includes fields such as a PHY header, a MAC Header, a resource unit allocation parameter, and an FCS as illustrated in FIG. 13.

The MAC header field includes fields such as frame control, duration/ID, a transmitter address (TA), and a receiver address (RA). Since it is desirable that the trigger frame be received by many STAs 20-2, a broadcast address may be stored in the RA field.

The sub area information is stored in the resource unit allocation parameter field. For example, sub area (SA) fields storing the sub area information that are equal in number to the sub areas are included in this field, and, for example, N pieces of sub area information such as SA #1 to SA # N are stored as illustrated in FIG. 13. The SA field includes fields such as a condition parameter, a frequency map, a timing map, and a spatial map.

Information about the transmission setting condition is stored in the condition parameter field. Specifically, information corresponding to the transmission setting condition is stored in this field. Information indicating content of the transmission setting condition may be stored in this field. A specific example of the transmission setting condition included in the condition parameter field will be described with reference to FIG. 14. FIG. 14 is a diagram illustrating an example of the transmission setting condition included in the condition parameter field of the trigger frame to be transmitted according to the present embodiment.

Information corresponding to any one of the transmission setting conditions is stored in the condition parameter field. For example, parameters 0x01 to 0x04 defined by 2-byte codes are prepared as information corresponding to types of frame as illustrated in FIG. 14. For example, the parameters 0x01 to 0x04 correspond to a probe request, power save polling, any other control frame, and a data frame.

Further, parameters 0x09 to 0x0C are prepared as information corresponding to data sizes for the UL frame. For example, the parameters 0x09 to 0x0C correspond to 1 to 127 octets, 128 to 1023 octets, and 1K to 1M octets, and more than 1M octets as the size of data accumulated in the transmission buffer 112.

Further, parameters 0x10 and 0x11 are prepared as information corresponding to the RSSIs measured by the STA 20-2. For example, the parameters 0x10 and 0x11 correspond to an RSSI weaker than a threshold value and an RSSI stronger than the threshold value. The RSSI may be a specific numerical value of the threshold value.

Further, parameters 0x20 to 0x22 are prepared as information corresponding to a modulation scheme and a coding rate used by the STA 20-2. For example, the parameters 0x20 to 0x22 correspond to binary phase shift keying (BPSK)/quadrature phase shift keying (QPSK), 16 quadrature amplitude modulation (QAM)/64QAM, and 256QAM as the MCS.

Note that information corresponding to a combination of a plurality of transmission setting conditions may be stored in the condition parameter field.

Figure 15C:
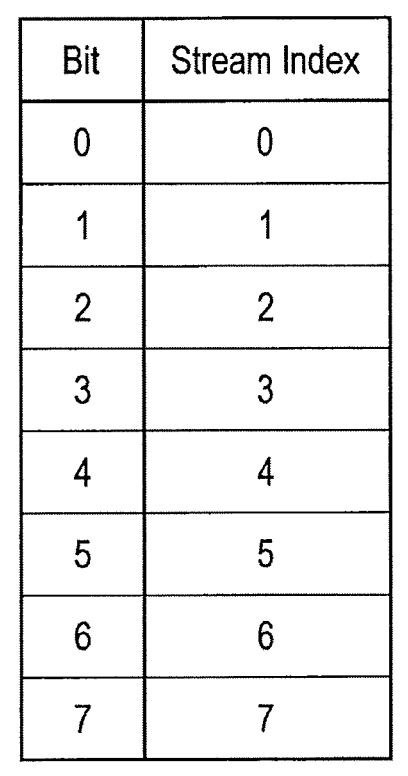

Referring back to FIG. 13, returning to the description of the example of the configuration of the trigger frame according to the present embodiment, information in which the frequency allocated to the resource unit is specified, information in which the time allocated to the resource unit is specified, and information in which the space stream allocated to the resource unit is specified are stored in the frequency map, the timing map, and the spatial map field, respectively. Specific examples of information included in the frequency map, the timing map, and the spatial map field will be described with reference to FIGS. 15A to 15C. FIGS. 15A to 15C are diagrams illustrating examples of information included in the frequency map, the timing map, and the spatial map field of the trigger frame to be transmitted according to the present embodiment.

Information corresponding to a frequency channel is stored in the frequency map field. For example, bit information corresponding to a channel ID (Identifier) is stored in the frequency map field as illustrated in FIG. 15A. A bit corresponding to an available channel ID is set to 1, and a bit corresponding to an unavailable channel ID is set to 0. Information about a frequency corresponding to the bit information may be a center frequency instead of the channel ID.

Information corresponding to a transmission period of time is stored in the timing map field. For example, bit information corresponding to the number of short inter frame spaces (SIFSs) is stored in the timing map field as illustrated in FIG. 15B. Information about the transmission period of time corresponding to the bit information may be the number of other IFSs or may be the transmission period of time instead of the number of SIFSs.

Information corresponding to the space stream is stored in the spatial map field. For example, bit information corresponding to an index of the space stream is stored in the spatial map field as illustrated in FIG. 15C.

(Reception of Response Frame)

Figure 16:
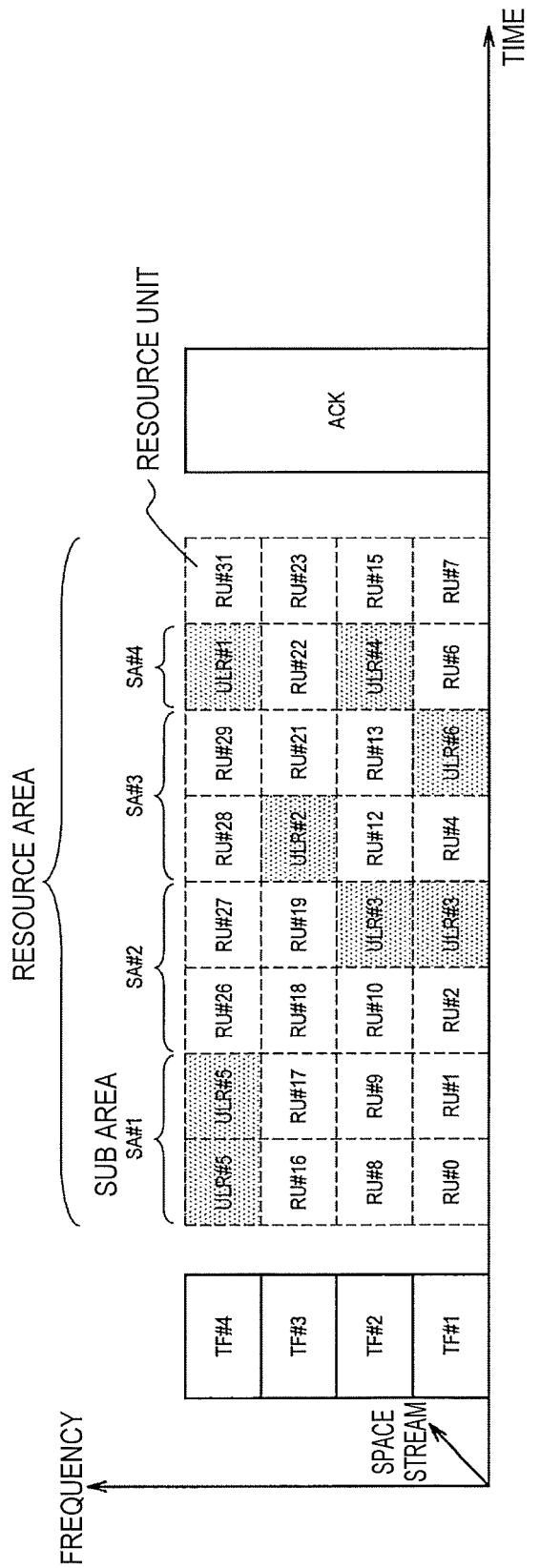
FIG. 16 is a diagram for describing an example of a frame sequence in communication performed by an AP and an STA according to the present embodiment.

After transmitting the trigger frame, the AP 10-2 receives the response UL frame to the trigger frame. Specifically, the AP 10-2 receives the response UL frame on the basis of the sub area information. More specifically, the control unit 120 causes the wireless communication unit 130 to perform the reception setting so that it is on standby for reception within the range of the decided resource area after transmitting the trigger frame. The response UL frame is transmitted using at least one resource unit selected in the sub area. For example, the AP 10-2 performs the reception setting so that the frame is received through the entire resource area illustrated in FIG. 12, and receives the ULR frames transmitted from each of the STAs 20-2 using the selected resource units. A response UL frame reception process of the AP 10-2 will be described in detail with reference to FIG. 16. FIG. 16 is a diagram for describing an example of a frame sequence in communication performed by the AP 10-2, etc. according to the present embodiment.

After transmitting the trigger frame, the AP 10-2 starts to wait for the response UL frame. For example, after transmitting the trigger frame, the control unit 120 causes the wireless communication unit 130 to perform the reception setting on the basis of the resource area illustrated in FIG. 16.

Upon receiving a signal related to the response UL frame, the AP 10-2 stores the sub area to which the signal belongs. For example, when the signal of the response UL frame, for example, a preamble, is received by the wireless communication unit 130, the control unit 120 specifies the sub area on the basis of the time, the frequency, and the space stream related to reception of the preamble. Then, the control unit 120 stores the specified sub area. As a result, the control unit 120 detects the presence of the response UL frame. Thus, the presence or absence of the transmission of the response UL frame is detected regardless of the presence or absence of the reception of the response UL frame, and thus an action can be performed on the STA 20-2 without waiting for the reception of the response UL frame.

Upon receiving the response UL frame, the AP 10-2 stores the sub area to which the response UL frame belongs. For example, after the preamble is received by the wireless communication unit 130, when the response UL frame is successfully received, the control unit 120 specifies the sub area on the basis of the time, the frequency, and the space stream related to the reception of the response UL frame. Then, the control unit 120 stores the specified sub area. The control unit 120 associates the specified sub area with the response UL frame, and stores the association.

Note that, in a case where the sub area is not stored on the basis of the preamble, and the reception of the response UL frame fails, the control unit 120 may specify the sub area related to the signal for the main body of the response UL frame and store the specified sub area. For example, in a case where an error is detected on the basis of a cyclic redundancy check (CRC) of the response UL frame, the sub area related to signal detection of the response UL frame is stored.

(Transmission of Confirmation Response Frame)

Upon receiving the response UL frame, the AP 10-2 transmits a frame (hereinafter, also referred to as a "response DL frame") serving as the response to the response UL frame. Specifically, when the signal for the response UL frame is received, the AP 10-2 transmits the confirmation response frame for the response UL frame. For example, after the waiting for the response UL frame ends, the control unit 120 generates the ACK information corresponding to the sub area on the basis of the storage of the sub area, and causes the data processing unit 110 to generate the ACK frame including the ACK information. Then, the generated ACK frame is transmitted through the wireless communication unit 130. The ACK frame may be a multi ACK frame including a plurality of pieces of ACK information.

Further, after the waiting for the response UL frame ends, the control unit 120 generates the ACK information addressed to the transmission source of the response UL frame on the basis of the association of the sub area and the response UL frame, and causes the data processing unit 110 to generate the ACK frame including the ACK information. Then, the generated ACK frame is transmitted through the wireless communication unit 130. The ACK frame may be generated separately from the ACK frame including the ACK information corresponding to the sub area, or both pieces of ACK information may be included in one ACK frame.

Note that the ACK frames are transmitted through all available channels, for example, as illustrated in FIG. 16.

Further, the response DL frame may be a frame different from the confirmation response frame. Specifically, in a case where the response UL frame is a data connection request frame, the AP 10-2 transmits a communication connection response frame as the response to the response UL frame. For example, in a case where the response UL frame is a probe request frame, the AP 10-2 transmits a probe response frame to the STA 20-2 serving as the transmission source of the probe request frame.

((Functions of STA))

Next, characteristic functions of the STA 20-2 will be described.

(Reception of Trigger Frame)

The STA 20-2 receives the trigger frame from the AP 10-2. Specifically, when the trigger frame is received by the wireless communication unit 130, the STA 20-2 acquires the sub area information included in the trigger frame through the data processing unit 110.

(Selection of Sub Area and Resource Unit)

The STA 20-2 selects the sub area on the basis of the sub area information. Specifically, the control unit 120 specifies the sub area corresponding to the satisfied transmission setting condition among the transmission setting conditions included in the sub area information. For example, the transmission setting conditions corresponding to the sub areas SA #1 to SA #4 illustrated in FIG. 16 are considered to be that the data size is 128 to 1023 octets, the data size is 1K to 1M octets, the RSSI is weak, and it is the probe request. In this case, values of the condition parameter fields included in the SA field of the trigger frame are 0x0A, 0x0B, 0x10, and 0x01. The control unit 120 acquires the size of data accumulated in the transmission buffer 112, and specifies the sub area of the parameter to which the acquired data size corresponds. For example, in a case where the acquired data size is 255 octets, the control unit 120 selects the sub area SA #1. Further, in a case where the RSSI of its own apparatus is weak, that is, lower than the threshold value, the control unit 120 selects the sub area SA #3. Further, in a case where a type of frame whose UL transmission is scheduled is the probe request, the control unit 120 selects the sub area SA #4.

Note that a plurality of sub areas may be selected. For example, in the above example, the control unit 120 selects both of the sub areas SA #1 and SA #3 in a case where the RSSI of its own apparatus is lower than the threshold value, and the size of data stored in the transmission buffer 112 is 255 octets.

Then, the STA 20-2 selects the resource unit from the selected sub area. Specifically, the control unit 120 selects the resource unit used for the UL transmission among a group of resource units included in the selected sub area. For example, in a case where the sub area SA #4 illustrated in FIG. 16 is selected, the control unit 120 selects at least one resource unit from resource units RU #6, RU #14, RU #22 and RU #30 included in the sub area SA #4. In the example of FIG. 16, in the sub area SA #4, the STA 20-2#1 selects the resource unit RU #30, and the STA 20-2#4 selects the resource unit RU #14.

Note that a plurality of resource units may be selected. Specifically, in a case where its own apparatus can simultaneously use a plurality of channels, the control unit 120 selects a plurality of resource units from the sub area on the basis of the plurality of channels. For example, in a case where its own apparatus supports the channel bonding, the control unit 120 of the STA 20-2#3 selects the two resource units RU #3 and RU #11 corresponding to the channels usable by its own apparatus in the sub area SA #2 illustrated in FIG. 16.

Further, in a case where the importance of the UL frame related to the response UL frame is higher than those of other frames, the control unit 120 may select a plurality of resource units from the sub area. For example, in a case where a priority of data related to the UL frame that is scheduled to be transmitted is higher than those of other data, the control unit 120 of the STA 20-2#5 selects the two resource units RU #24 and RU #25 in the sub area SA #1 illustrated in FIG. 16.

Further, the control unit 120 may select a resource unit of a different frequency channel from the resource units selected by the other STAs 20-2. For example, the control unit 120 causes the wireless communication unit 130 to scan each frequency channel at an arbitrary timing. Then, the control unit 120 causes the wireless communication unit 130 to store transmission frequencies previously used by the other STAs 20-2 on the basis of the scanning result, and specifies frequency channels that are not used by the other STAs 20-2 using the previously used transmission frequencies.

(Transmission of Response Frame)

Figure 17:
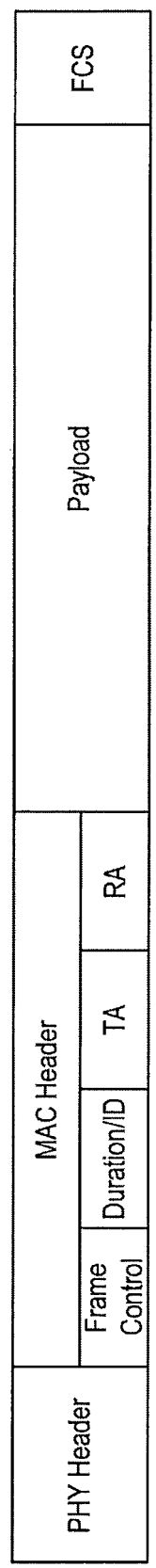
FIG. 17 is a diagram illustrating an example of a configuration of a response UL frame according to the present embodiment.

The STA 20-2 transmits the response UL frame serving as the response to the trigger frame to the AP 10-2 using at least one resource unit selected from the sub area specified in the sub area information. Specifically, the control unit 120 causes the data processing unit 110 to generate the ULR frame after selecting the sub area and the resource unit. The control unit 120 causes the wireless communication unit 130 to perform the transmission setting so that the frame transmission can be performed using the selected resource unit. Then, the wireless communication unit 130 transmits the generated ULR frame in accordance with the transmission setting. A configuration of the response UL frame will be described in detail with reference to FIG. 17. FIG. 17 is a diagram illustrating an example of a configuration of the response UL frame according to the present embodiment.

The ULR frame serving as the response UL frame includes fields such as a PHY header, a MAC header, a payload, and an FCS as illustrated in FIG. 17. In the TA field, a MAC address of the STA 20-2 is stored, but information specifying the STA 20-2 such as the STA ID may be stored instead of the MAC address. An address of the AP 10-2 may be stored in the RA field. Any information may be stored in the payload field, and the payload field may be omitted.

(Reception of Confirmation Response Frame)

The STA 20-2 receives the frame serving as the response to the response UL frame after transmitting the response UL frame. Specifically, the STA 20-2 receives the confirmation response frame to the response UL frame. More specifically, the wireless communication unit 130 receives the ACK frame to the ULR frame after a predetermined period of time elapses from the transmission of the ULR frame. The ACK frame may be the multi ACK frame including a plurality of pieces of ACK information. In this case, the control unit 120 determines the presence or absence of the ACK information addressed to its own apparatus, and performs a retransmission process of the ULR frame in a case where the ACK information addressed to its own apparatus is determined not to be included.

3-3. Processes of Apparatuses

Next, processes of the AP 10-2 and the STA 20-2 according to the present embodiment will be described. A description of processes that are substantially the same as the above-described processes is omitted.

(Sub Area Decision Process of AP)

Figure 18:
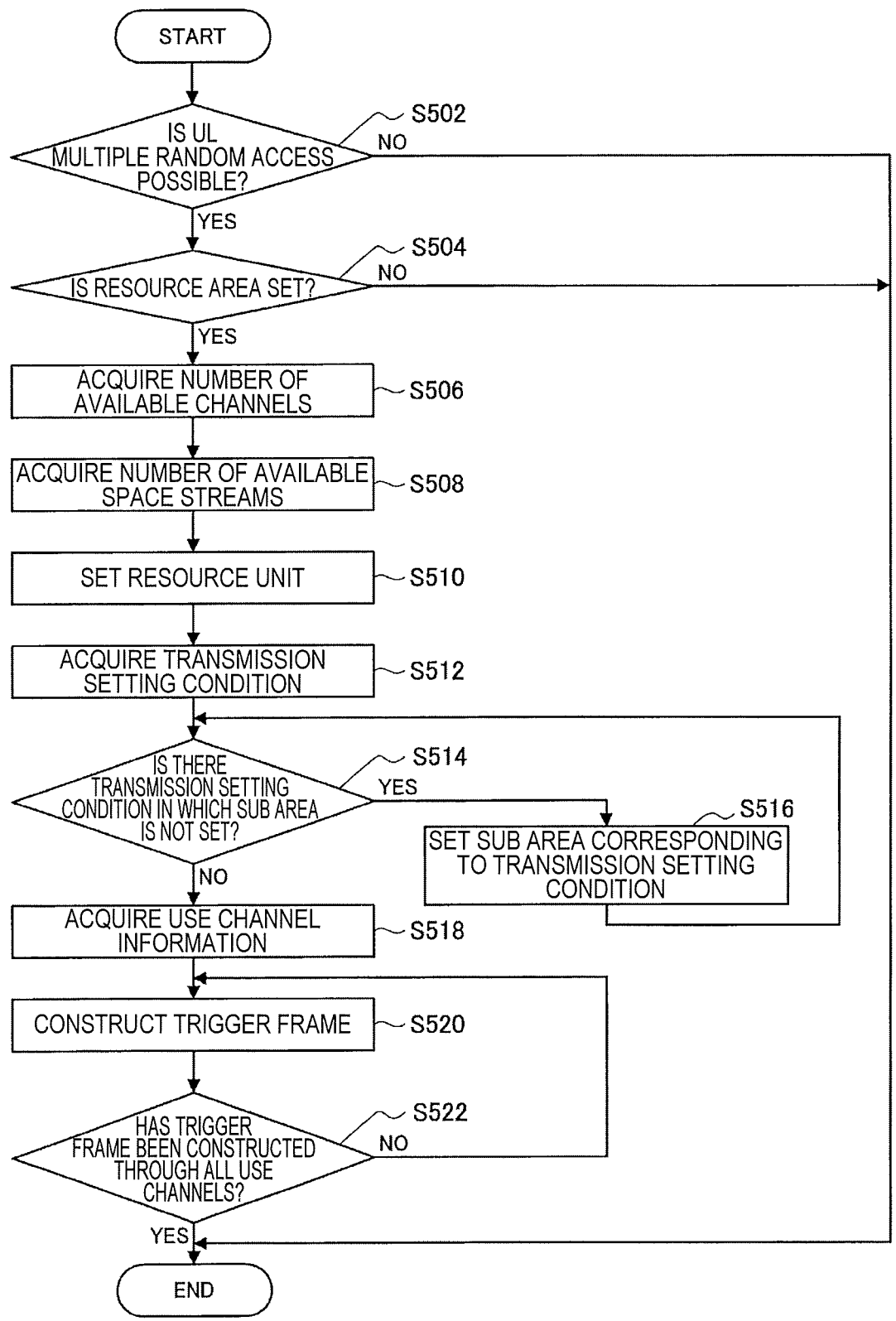
FIG. 18 is a flowchart conceptually illustrating a sub area decision process of an AP according to the present embodiment.

First, a sub area decision process of the AP 10-2 according to the present embodiment will be described with reference to FIG. 18. FIG. 18 is a flowchart conceptually illustrating the sub area decision process of the AP 10-2 according to the present embodiment.

The AP 10-2 determines whether or not UL multiple random access is possible (step S502). Specifically, the control unit 120 determines whether or not its own apparatus supports the random access scheme based on UL multiplexing. In a case where its own apparatus is determined not to support the random access scheme based on UL multiplexing, the process ends.

When the UL multiple random access is determined to be possible, the AP 10-2 determines the presence or absence of a setting of the resource area (step S504). Specifically, when its own apparatus is determined to support the UL multiple random access scheme, the control unit 120 determines whether or not the resource area (the resource unit) is set. In a case where the resource area is determined not to be set, the process ends.

When the resource area is determined to be set, the AP 10-2 acquires the number of available channels (step S506). Specifically, when the resource area is determined to be set, the control unit 120 acquires the number of frequency channels available for the UL transmission. At this time, the channels already being used in other communication are excluded as targets.

Then, the AP 10-2 acquires the number of available space streams (step S508). Specifically, the control unit 120 acquires the number of indices of space streams available for the UL transmission. Similarly to the frequency channel, the space streams already being used for other communication may be excluded as targets.

Then, the AP 10-2 sets the resource unit (step S510) Specifically, the control unit 120 sets the resource area and the resource unit on the basis of an available transmission period of time in addition to the acquired number of frequency channels and the number of indices of space streams.

Then, the AP 10-2 acquires the transmission setting condition (step S512). Specifically, the control unit 120 acquires the transmission setting condition corresponding to the setting condition of the sub area. For example, the transmission setting condition may be stored in a storage unit with which the AP 10-2 is separately equipped and acquired from another apparatus through communication.

Then, the AP 10-2 determines whether or not there is a transmission setting condition in which the sub area is not set (step S514). Specifically, the control unit 120 determines whether or not there is the transmission setting condition in which the sub area is not set, and the resource unit remains in the resource area.

In a case where it is determined that there is the transmission setting condition in which the sub area is not set, the AP 10-2 sets the sub area corresponding to the transmission setting condition (step S516). Specifically, when it is determined that there is the transmission setting condition in which the sub area is not set, and the resource unit remains in the resource area, the control unit 120 decides the size of resources for the transmission setting condition, and sets the sub area of the decided resource size in the resource area. The resource size may be decided on the basis of the number of STAs 20-2 connected to the AP 10-2, the throughput in communication with the STA 20-2, or the like. The resource size may be decided in accordance with a degree of interference caused by radio waves received from other neighboring APs.

In a case where it is determined that there is no transmission setting condition in which the sub area is not set, the AP 10-2 acquires use channel information (step S518). Specifically, in a case where there is no transmission setting condition in which the sub area is not set or no resource unit remains in the resource area, the control unit 120 acquires information indicating a frequency channel available for transmission of the trigger frame.

Then, the AP 10-2 constructs the trigger frame (step S520). Specifically, the control unit 120 causes the data processing unit 110 to generate the trigger frame including the sub area information for one unit channel among the frequency channels indicated by the acquired information.

Then, the AP 10-2 determines whether or not the trigger frame has been constructed through all use channels (step S522). Specifically, the control unit 120 determines whether or not an instruction to generate the trigger frame for all the frequency channels indicated by the acquired information has been given. In a case where the trigger frame has not been constructed for any one of the frequency channels, the process returns to step S520.

(Communication Process of AP with STA)

Figure 19:
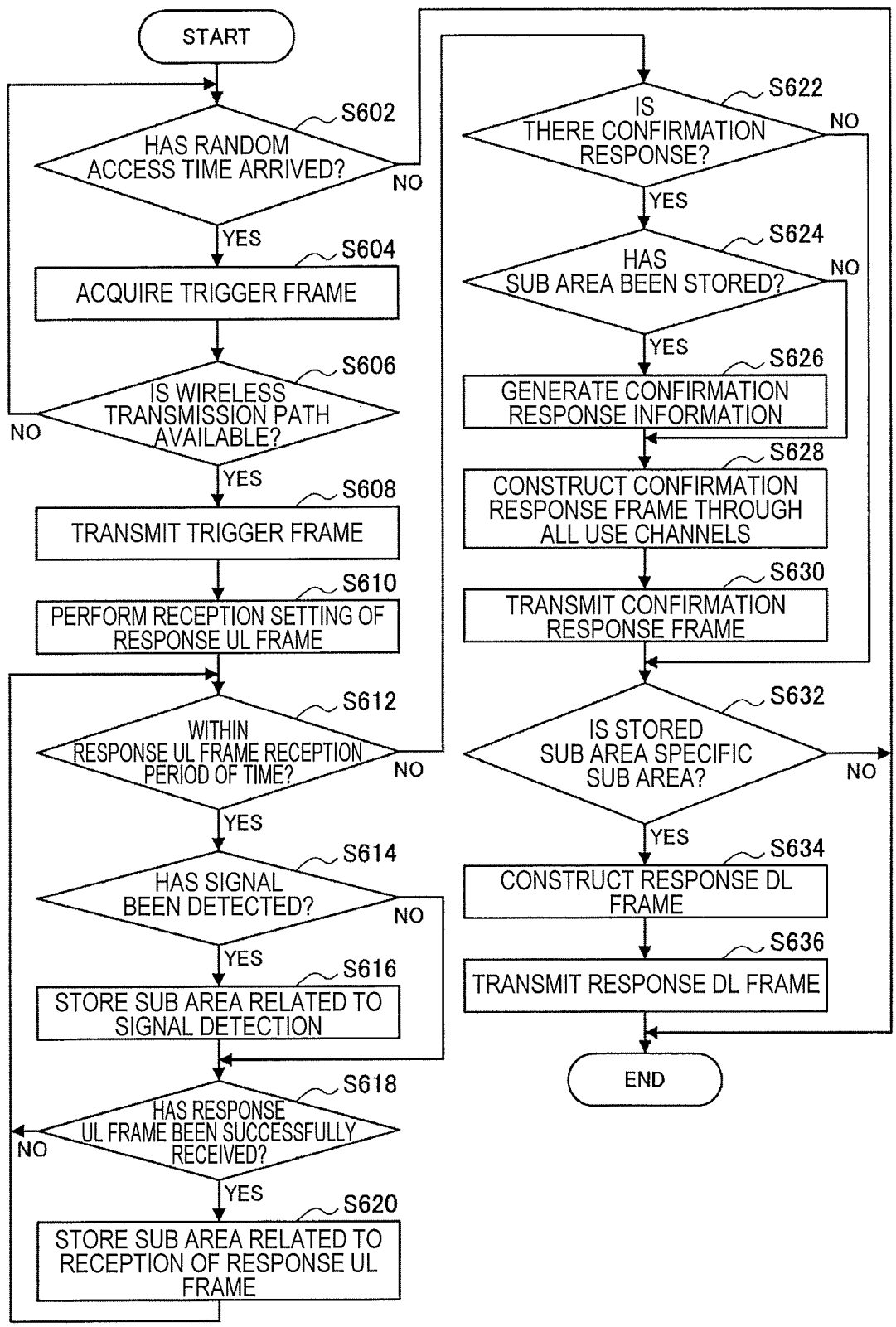
FIG. 19 is a flowchart conceptually illustrating a communication process of an AP with an STA according to the present embodiment.

Next, a communication process of the AP 10-2 with the STA 20-2 according to the present embodiment will be described with reference to FIG. 19. FIG. 19 is a flowchart conceptually illustrating the communication process of the AP 10-2 with the STA 20-2 according to the present embodiment.

The AP 10-2 determines whether or not a random access time has arrived (step S602). Specifically, the control unit 120 determines whether or not the random access time decided in its own apparatus has arrived.

When the random access time is determined to have arrived, the AP 10-2 acquires the trigger frame (step S604). Specifically, when the random access time is determined to have arrived, the control unit 120 causes the data processing unit 110 to acquire the trigger frame that is previously constructed.

Then, the AP 10-2 determines whether or not a wireless transmission path is available (step S606). Specifically, the control unit 120 determines whether or not the wireless transmission path is empty using a carrier sense or the like.

When the wireless transmission path is determined to be available, the AP 10-2 transmits the trigger frame to the STA 20-2 (step S608). Specifically, when the wireless transmission path is determined to be empty, the control unit 120 causes the wireless communication unit 130 to transmit the acquired trigger frame.

Then, the AP 10-2 performs the reception setting of the response UL frame (step S610). Specifically, after the trigger frame is transmitted, the control unit 120 causes the wireless communication unit 130 to perform the reception setting on the basis of the sub area information included in the trigger frame so that the response UL frame transmitted from the STA 20-2 is received.

Then, the AP 10-2 determines whether or not it is within a response UL frame reception period of time (step S612). Specifically, the control unit 120 determines whether or not a predetermined period of time has elapsed from the transmission of the trigger frame.

When it is determined to be within the response UL frame reception period of time, the AP 10-2 is on standby until the signal is detected (step S614). Specifically, in a case where the predetermined period of time is determined not to have elapsed from the transmission of the trigger frame, the control unit 120 is continuously on standby for the signal detection.

When the signal is detected, the AP 10-2 stores the sub area related to the signal detection (step S616). Specifically, when the signal is detected by the wireless communication unit 130, the control unit 120 specifies the sub area on the basis of the time, the frequency, and the space stream in which the signal is detected. Then, the control unit 120 stores information indicating the specified sub area in a storage unit with which the AP 10-2 is separately equipped.

Then, the AP 10-2 determines whether or not the response UL frame has been successfully received (step S618). Specifically, the control unit 120 determines whether or not the response UL frame is received by the wireless communication unit 130 and stored in a reception buffer.

When the response UL frame is successfully received, the AP 10-2 stores the sub area related to the reception of the response UL frame (step S620). Specifically, when the response UL frame is received, the control unit 120 specifies the sub area on the basis of the time, the frequency, and the space stream in which the response UL frame is received. Then, the control unit 120 causes information indicating the specified sub area to be stored in a storage unit.

In a case where it is determined not to be within the response UL frame reception period of time in step S612, the AP 10-2 determines the presence or absence of a confirmation response (step S622). Specifically, when the predetermined period of time is determined to have elapsed from the transmission of the trigger frame, the control unit 120 determines the presence or absence of execution of the confirmation response.

When the confirmation response frame is determined to be transmitted, the AP 10-2 determines the presence or absence of storage of the sub area (step S624). Specifically, when the confirmation response is determined to be performed, the control unit 120 determines whether or not information indicating the sub area is stored.

When the sub area is determined to be stored, the AP 10-2 generates the confirmation response information (step S626). Specifically, when the information indicating the sub area is determined to be stored, the control unit 120 generates the ACK information for each piece of information indicating the sub area.

Then, the AP 10-2 constructs the confirmation response frame through all use channels (step S628). Specifically, the control unit 120 causes the data processing unit 110 to generate the ACK frame including the generated ACK information for all the available channels.

Then, the AP 10-2 transmits the confirmation response frame to the STA 20-2 (step S630). Specifically, the control unit 120 causes the wireless communication unit 130 to transmit the generated ACK frame.

Then, the AP 10-2 determines whether or not the stored sub area is a specific sub area (step S632). Specifically, the control unit 120 determines whether or not the sub area indicated by the stored information is the sub area in which the UL frame in which the response is desired is transmitted. For example, the specific sub area may be the sub area in which the corresponding transmission setting condition indicates that a type of frame is the probe request.

When the stored sub area is determined to be the specific sub area, the AP 10-2 constructs the response DL frame serving as the response to the response UL frame (step S634). Specifically, the control unit 120 causes the data processing unit 110 to generate the response DL frame corresponding to the response UL frame associated with the sub area.

Then, the AP 10-2 transmits the response DL frame (step S636). Specifically, the control unit 120 causes the wireless communication unit 130 to transmit the generated response DL frame.

Note that the sub area information included in the trigger frame may be updated before a next trigger frame is transmitted. For example, the control unit 120 determines the presence or absence of update of the sub area information before the trigger frame is transmitted. When the sub area information is determined to be updated, the control unit 120 updates the sub area information. Then, the trigger frame including the updated sub area information is transmitted.

(Communication Process of STA with AP)

Figure 20:
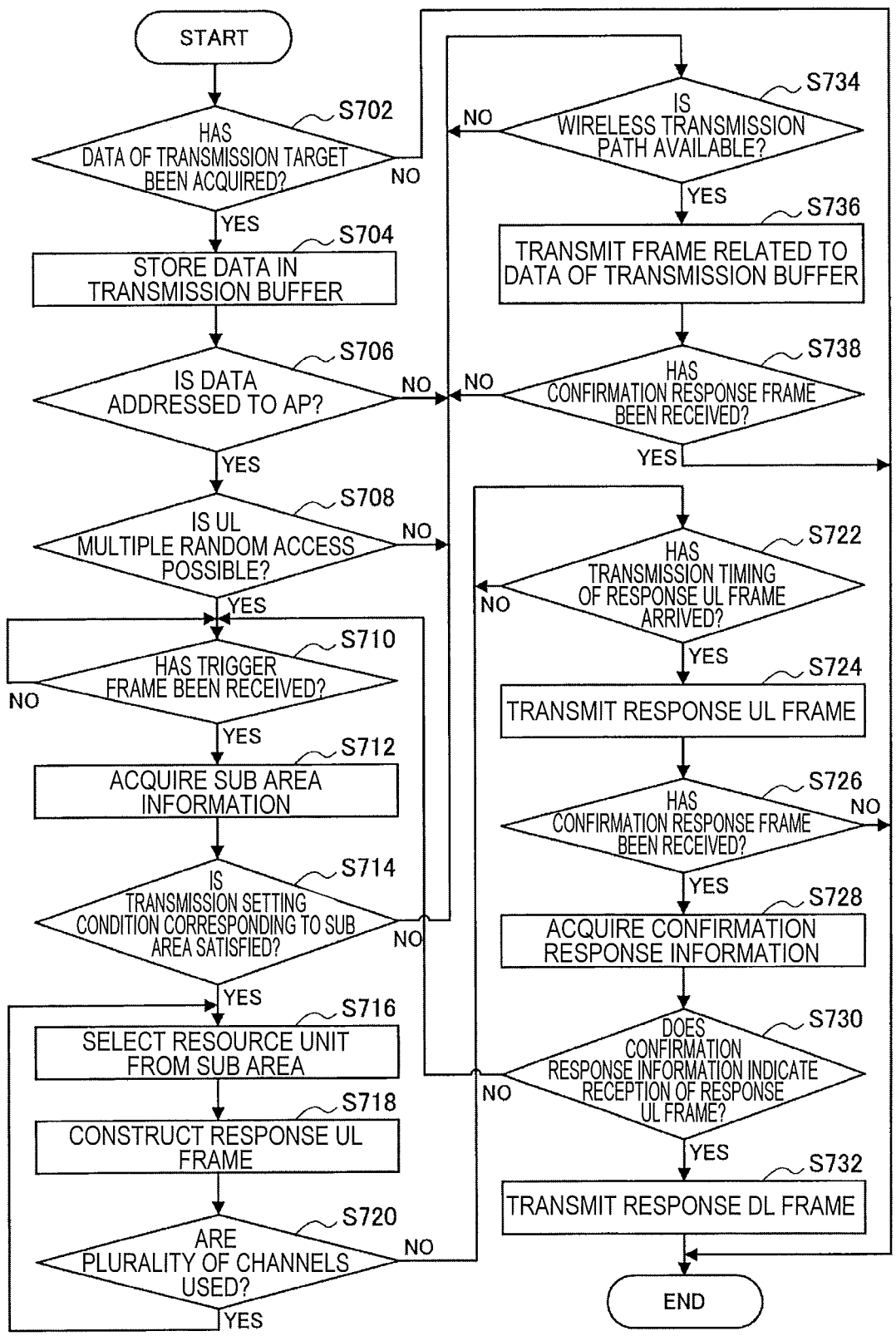
FIG. 20 is a flowchart conceptually illustrating a communication process of an STA with an AP according to the present embodiment.

Next, a communication process of the STA 20-2 with the AP 10-2 according to the present embodiment will be described with reference to FIG. 20. FIG. 20 is a flowchart conceptually illustrating the communication process of the STA 20-2 with the AP 10-2 according to the present embodiment.

The STA 20-2 determines whether or not data of a transmission target has been acquired (step S702). Specifically, the data processing unit 110 determines whether or not data acquired through the interface 111 is the transmission target.

When the data of the transmission target is determined to have been acquired, the STA 20-2 stores the data in the transmission buffer 112 (step S704). Specifically, when the acquired data is determined to be the transmission target, the data processing unit 110 stores the data in the transmission buffer 112.

Then, the STA 20-2 determines whether or not the data is addressed to the AP 10-2 (step S706). Specifically, the control unit 120 determines whether or not the data stored in the transmission buffer 112 is data addressed to the AP 10-2.

When the data is determined to be information addressed to the AP 10-2, the STA 20-2 determines whether or not the UL multiple random access is possible (step S708). Specifically, the control unit 120 determines whether or not its own apparatus supports the random access scheme on the basis of UL multiplexing.

When the UL multiple random access is determined to be possible, the STA 20-2 is on standby until the trigger frame is received (step S710). Specifically, when its own apparatus is determined to support the UL multiple random access scheme, the control unit 120 is on standby until the trigger frame is received by the wireless communication unit 130.

Upon receiving the trigger frame, the STA 20-2 acquires the sub area information (step S712). Specifically, when the trigger frame is received by the wireless communication unit 130, the data processing unit 110 acquires the sub area information from the trigger frame.

Then, the STA 20-2 determines whether or not the transmission setting condition corresponding to the sub area is satisfied (step S714). Specifically, the control unit 120 determines whether or not the transmission setting condition included in the acquired sub area information is satisfied.

When the transmission setting condition corresponding to the sub area is determined to be satisfied, the STA 20-2 selects the resource unit from the sub area (step S716). Specifically, when the transmission setting condition is determined to be satisfied, the control unit 120 selects the resource unit from the sub area corresponding to the transmission setting condition.

Then, the STA 20-2 constructs the response UL frame (step S718). Specifically, the control unit 120 causes the data processing unit 110 to generate the response UL frame on the basis of the selected resource unit.

Then, the STA 20-2 determines whether or not a plurality of channels are used (step S720). Specifically, the control unit 120 determines whether or not its own apparatus can use a plurality of channels, that is, supports the channel bonding. In a case where its own apparatus is determined to be able to use a plurality of channels, the resource unit of another frequency is selected, and the response UL frame is constructed for the selected resource unit.

When the construction of the response UL frame ends, the STA 20-2 is on standby until the transmission timing of the response UL frame arrives (step S722). Specifically, the control unit 120 causes the wireless communication unit 130 to be on standby for the transmission of the response UL frame until a transmission period of time of the selected resource unit arrives.

When the transmission timing of the response UL frame arrives, the STA 20-2 transmits the response UL frame (step S724). Specifically, when the transmission period of time of the selected resource unit arrives, the control unit 120 causes the wireless communication unit 130 to transmit the response UL frame.

Then, the STA 20-2 is on standby until the confirmation response frame is received (step S726). Specifically, in a case where transmission of the confirmation response frame is scheduled, the control unit 120 is on standby until the ACK frame is received after the response UL frame is transmitted.

When the confirmation response frame is received, the STA 20-2 acquires the confirmation response information (step S728). Specifically, when the ACK frame is received, the data processing unit 110 acquires the ACK information from the ACK frame.

Then, the STA 20-2 determines whether or not the confirmation response information indicates reception of the response UL frame (step S730). Specifically, the control unit 120 determines whether or not the acquired ACK information indicates reception of the response UL frame transmitted by its own apparatus.

When the confirmation response information is determined to indicate the reception of the response UL frame, the STA 20-2 is on standby for reception of the response DL frame (step S732). Specifically, in a case where the ACK information is determined to indicate the reception of the response UL frame transmitted by its own apparatus, the control unit 120 ends the process when the response UL frame in which the response DL frame is not requested is transmitted. On the other hand, in a case where the response UL frame in which the response DL frame is requested is transmitted, the control unit 120 is on standby for reception of the response DL frame, and ends the process when the response DL frame is received.

Note that in a case where the data is determined not to be addressed to the AP 10-2 in step S706, in a case where the UL multiple random access is determined not to be possible in step S708, or in a case where the transmission setting condition corresponding to the sub area is determined not to be satisfied in step S714, the STA 20-2 determines whether or not the wireless transmission path is available (step S734). Specifically, the control unit 120 determines whether or not the wireless transmission path is empty using a carrier sense or the like.

When the wireless transmission path is determined to be available, the STA 20-2 transmits a frame related to data of the transmission buffer 112 (step S736). Specifically, when the wireless transmission path is determined to be empty, the control unit 120 causes the data processing unit 110 to generate the data frame on the basis of the data stored in the transmission buffer 112. Then, the generated data frame is transmitted through the wireless communication unit 130.

Then, the STA 20-2 determines whether or not the confirmation response frame has been received (step S738). Specifically, the control unit 120 determines whether or not the ACK frame to the data frame has been received after transmitting the data frame. In a case where the ACK frame has not been received, the control unit 120 causes the process to return to step S734, and performs the retransmission process of the data frame.

3-4. Conclusion of Second Embodiment

As described above, according to the second embodiment of the present disclosure, the AP 10-2 transmits the trigger frame including the sub area information in which the sub area is specified from the resource area including wireless communication resources selectable as uplink resources, and receives the response frame to the trigger frame. The STA 20-2 receives the trigger frame including the sub area information in which the sub area is specified from the resource area including wireless communication resources selectable as uplink resources, and transmits the response frame to the trigger frame. Thus, the sub area is specified from the resources used for the UL transmission of the random access scheme, and so the UL transmission can be distinguished by the sub area. Further, through the distinguishing of the UL transmission in accordance with the sub area, information related to the communication parameter of the UL transmission can be efficiently collected, and the communication efficiency of the UL communication of the random access scheme can be suppressed from being lowered.

Further, the AP 10-2 receives the response frame on the basis of the sub area information. Thus, the reception setting is performed in accordance with the transmission parameter of the response UL frame, and certainty of reception of the response UL frame can be improved.

Further, the response frame is transmitted using at least one wireless communication resource selected from the sub area. Thus, the response UL frame is transmitted within the range of the selected resource unit, and thus it is possible to reduce the possibility that the resources of the response UL frames will overlap and more reliably reduce the possibility that the UL frames will collide. Further, in a case where a plurality of resource units are selected, a reception success rate of the ULR can be improved, and a notification indicating that a plurality of resources, for example, a plurality of frequency channels, are available can be given to the AP 10-2.

Further, the response frame includes a frame related to the uplink communication request. Thus, the ULR frame is transmitted on the basis of the sub area, and so information related to the ULR can be efficiently collected.

Further, the uplink communication request includes the data connection request. Thus, the frame related to the data connection request is transmitted on the basis of the sub area, and so it is possible to perform the communication connection process with a plurality of STAs 20-2 in parallel.

Further, the sub area is decided on the basis of the attribute information associated with transmission of an uplink frame related to the response frame. Thus, information related to the UL transmission that is scheduled is specified from the sub area, and so the information can be efficiently collected.

Further, the attribute information associated with the transmission of the uplink frame related to the response frame includes the information related to the attribute of the uplink frame. Thus, the attribute of the frame is distinguished by the sub area, and so it is possible to easily detect the number of transmissions of each type of UL frame.

Further, the attribute information associated with the transmission of the uplink frame includes a type of frame. Thus, a type of frame and the number of frames whose UL transmission is scheduled are specified, and so it is possible to appropriately allocate the resources for the UL transmission.

Further, the attribute information associated with the transmission of the uplink frame includes the size of data to be transmitted. Thus, the size of frame and the number of frames whose UL transmission is scheduled are specified, and so it is possible to appropriately allocate the resources for the UL transmission.

Further, the attribute information associated with the transmission of the uplink frame includes the information related to the redundancy of communication of the uplink frame. Thus, the redundancy of the UL transmission that is scheduled is appropriately adjusted, and so it is possible to improve certainty of reception of the UL frame.

Further, the information related to the redundancy of communication includes information related to at least one of a modulation scheme and a coding rate. Thus, the communication parameter that is easily set is used, and so it is possible to suppress the process from becoming complicated due to addition of the component according to the present embodiment.

Further, the attribute information associated with the transmission of the uplink frame includes the information related to the communication state of the transmission apparatus of the uplink frame. Thus, the communication parameter setting or the resource allocation in the UL communication is performed in accordance with the communication state of the STA 20-2, and so it is possible to more reliably suppress the decrease in the communication efficiency in the UL communication.

Further, the information related to the communication state of the transmission apparatus includes the information related to the radio wave propagation characteristics. Thus, the information related to the radio wave propagation characteristics of the STA 20-2 is collected, and so the communication parameter or resource allocation suitable for the STA 20-2 can be performed.

Further, upon receiving the signal for the response frame, the AP 10-2 transmits the frame serving as the response to the response frame. Here, for example, in a case where a plurality of response UL frames are transmitted using the same resource unit, the reception of the frame may fail, and the signal may be detected. In this regard, as in the present configuration, the frame, for example, the confirmation response frame, is transmitted to the STA 20-2 in accordance with the signal detection, and a notification indicating that the resource units overlap may be given to the STA 20-2. As a result, the STA 20-2 retransmits the response UL frame using another resource unit, and it is possible to succeed in the transmission of the response UL frame.

Further, in a case where its own apparatus can use a plurality of channels at the same time, the STA 20-2 transmits the response frame using a plurality of wireless communication resources selected from the sub area on the basis of the plurality of channels. Thus, the notification indicating that the STA 20-2 supports the channel bonding is given to the AP 10-2, and the resources are allocated for the UL transmission through a plurality of channels, and so it is possible to improve the communication efficiency in the UL transmission.

Further, in a case where the importance of the uplink frame related to the response frame is higher than those of the other frames, the STA 20-2 transmits the response frame using a plurality of wireless communication resources selected from the sub area. Thus, resource allocation corresponding to a plurality of resource units is performed in accordance with the importance of data whose UL transmission is scheduled, and so a transmission success rate of data can be improved.

4. APPLICATION EXAMPLE

The technology according to the embodiments of the disclosure can be applied to various products. For example, the STA 20 may be realized as mobile terminals such as smartphones, tablet PCs (Personal Computers), notebook PCs, portable game terminals, or digital cameras, fixed-type terminals such as television receivers, printers, digital scanners, or network storages, or car-mounted terminals such as car navigation devices. In addition, the STA 20 may be realized as terminals that perform M2M (Machine to Machine) communication (also referred to as MTC (Machine Type Communication) terminals) such as smart meters, vending machines, remotely controlled surveillance devices, or POS (Point Of Sale) terminals. Furthermore, the STA 20 may be wireless communication modules mounted in such terminals (for example, integrated circuit modules configured by one die).

On the other hand, for example, the AP 10 may be realized as a wireless LAN access point (also referred to as a wireless base station) which has a router function or does not have a router function. The AP 10 may be realized as a mobile wireless LAN router. The AP 10 may also be a wireless communication module (for example, an integrated circuit module configured with one die) mounted on the device.

4-1. First Application Example

Figure 21:
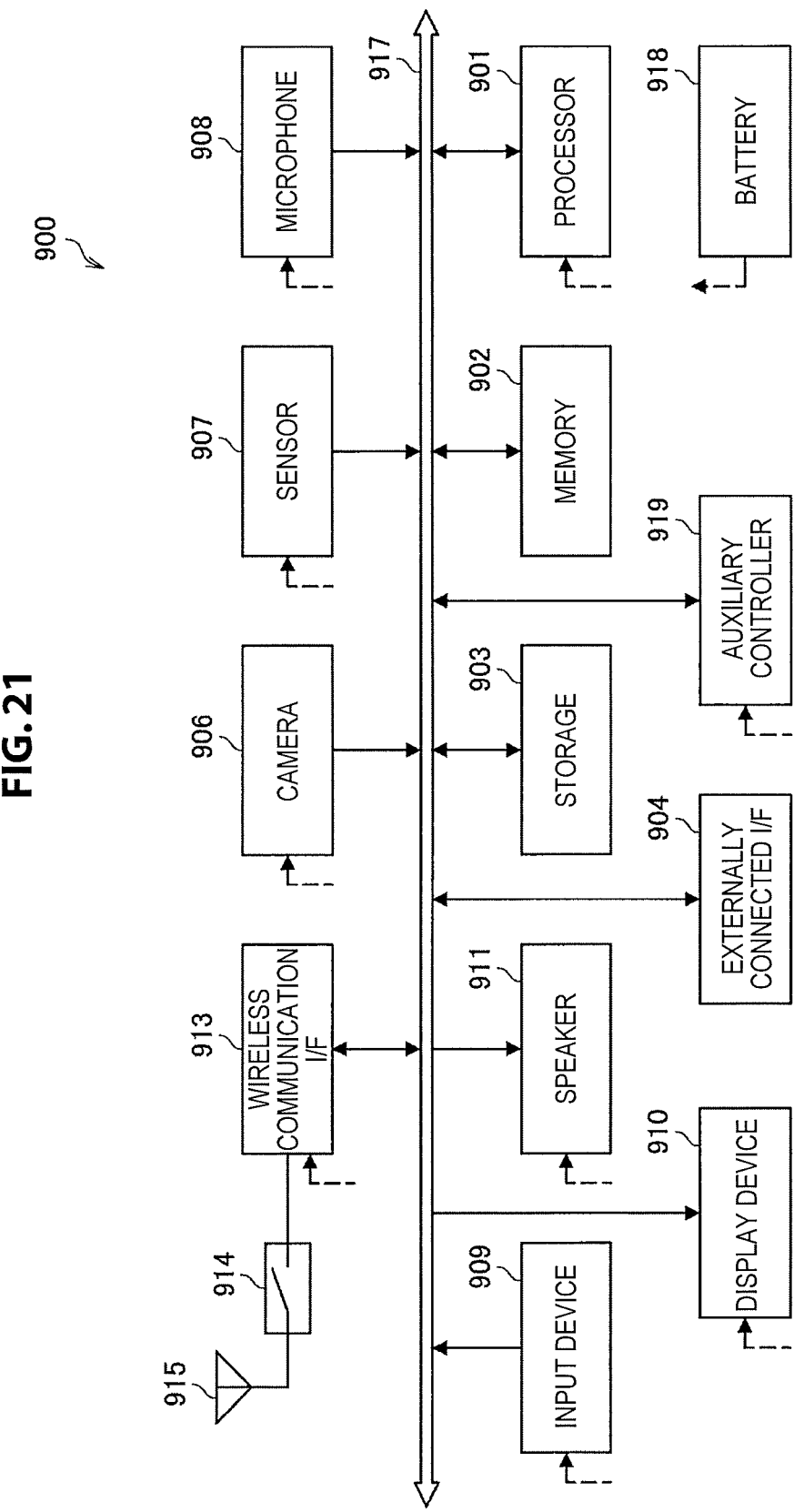
FIG. 21 is a block diagram illustrating an example of a schematic configuration of a smartphone.

FIG. 21 is a block diagram showing an example of a schematic configuration of a smartphone 900 to which the technology of the present disclosure can be applied. The smartphone 900 includes a processor 901, a memory 902, a storage 903, an externally connected interface 904, a camera 906, a sensor 907, a microphone 908, a input device 909, a display device 910, a speaker 911, a wireless communication interface 913, an antenna switch 914, an antenna 915, a bus 917, a battery 918, and an auxiliary controller 919.

The processor 901 may be, for example, a CPU (Central Processing Unit) or an SoC (System on Chip), and controls functions of an application layer and other layers of the smartphone 900. The memory 902 includes a RAM (Random Access Memory) and a ROM (Read Only Memory), and stores programs executed by the processor 901 and data. The storage 903 can include a storage medium such as a semiconductor memory or a hard disk. The externally connected interface 904 is an interface for connecting an externally attached device such as a memory card or a USB (Universal Serial Bus) device to the smartphone 900.

The camera 906 has an image sensor, for example, a CCD (Charge Coupled Device) or a CMOS (Complementary Metal Oxide Semiconductor), to generate captured images. The sensor 907 can include a sensor group including, for example, a positioning sensor, a gyro sensor, a geomagnetic sensor, an acceleration sensor, and the like. The microphone 908 converts sounds input to the smartphone 900 into audio signals. The input device 909 includes, for example, a touch sensor that detects touches on a screen of the display device 910, a key pad, a keyboard, buttons, switches, and the like, to receive manipulations or information inputs from a user. The display device 910 has a screen such as a liquid crystal display (LCD), or an organic light emitting diode (OLED) display to display output images of the smartphone 900. The speaker 911 converts audio signals output from the smartphone 900 into sounds.

The wireless communication interface 913 supports one or more wireless LAN standards of IEEE 802.11a, 11b, 11g, 11n, 11ac, and 11ad, to execute the wireless LAN communication. The wireless communication interface 913 can communicate with another device via a wireless LAN access point in an infrastructure mode. In addition, the wireless communication interface 913 can directly communicate with another device in a direct communication mode such as an ad hoc mode or Wi-Fi Direct (registered trademark). Wi-Fi Direct is different from the ad hoc mode, and thus one of two terminals operates as an access point. However, communication is performed directly between the terminals. The wireless communication interface 913 can typically include a baseband processor, an RF (Radio Frequency) circuit, a power amplifier, and the like. The wireless communication interface 913 may be a single-chip module on which a memory that stores a communication control program, a processor that executes the program, and a relevant circuit are integrated. The wireless communication interface 913 may support another kind of wireless communication scheme such as a cellular communication scheme, a short-range wireless communication scheme, or a proximity wireless communication scheme in addition to the wireless LAN scheme. The antenna switch 914 switches a connection destination of the antenna 915 for a plurality of circuits (for example, circuits for different wireless communication schemes) included in the wireless communication interface 913. The antenna 915 has a single or a plurality of antenna elements (for example, a plurality of antenna elements constituting a MIMO antenna), and is used for transmission and reception of wireless signals from the wireless communication interface 913.

Note that the smartphone 900 may include a plurality of antennas (for example, antennas for a wireless LAN or antennas for a proximity wireless communication scheme, or the like), without being limited to the example of FIG. 21. In this case, the antenna switch 914 may be omitted from the configuration of the smartphone 900.

The bus 917 connects the processor 901, the memory 902, the storage 903, the externally connected interface 904, the camera 906, the sensor 907, the microphone 908, the input device 909, the display device 910, the speaker 911, the wireless communication interface 913, and the auxiliary controller 919 to one another. The battery 918 supplies electric power to each of the blocks of the smartphone 900 shown in FIG. 21 via power supply lines partially indicated by dashed lines in the drawing. The auxiliary controller 919 causes, for example, necessary minimum functions of the smartphone 900 to be operated in a sleep mode.

In the smartphone 900 illustrated in FIG. 21, the data processing unit 110, the control unit 120 and the wireless communication unit 130 described above with reference to FIG. 4 may be implemented in the wireless communication interface 913. At least some of the functions may be implemented in the processor 901 or the auxiliary controller 919. For example, the control unit 120 causes the data processing unit 110 to generate the response UL frame serving as the response to the trigger frame on the basis of the resource information and the attribute information included in the received trigger frame, and causes the wireless communication unit 130 to transmit the generated response UL frame. As a result, the number of frames transmitted in the UL communication of the random access scheme performed by the smartphone 900 is reduced, the frame collision is consequently suppressed and thus the decrease in the communication efficiency can be suppressed. For example, the control unit 120 causes the data processing unit 110 to generate the response UL frame serving as the response to the trigger frame on the basis of the sub area information included in the received trigger frame, and causes the wireless communication unit 130 to transmit the generated response UL frame. As a result, the ULR is efficiently detected in the UL communication of the random access scheme performed by the smartphone 900, and thus the decrease in the communication efficiency can be suppressed.

Note that the smartphone 900 may operate as a wireless access point (software AP) as the processor 901 executes the function of an access point at an application level. In addition, the wireless communication interface 913 may have the function of a wireless access point.

4-2. Second Application Example

Figure 22:
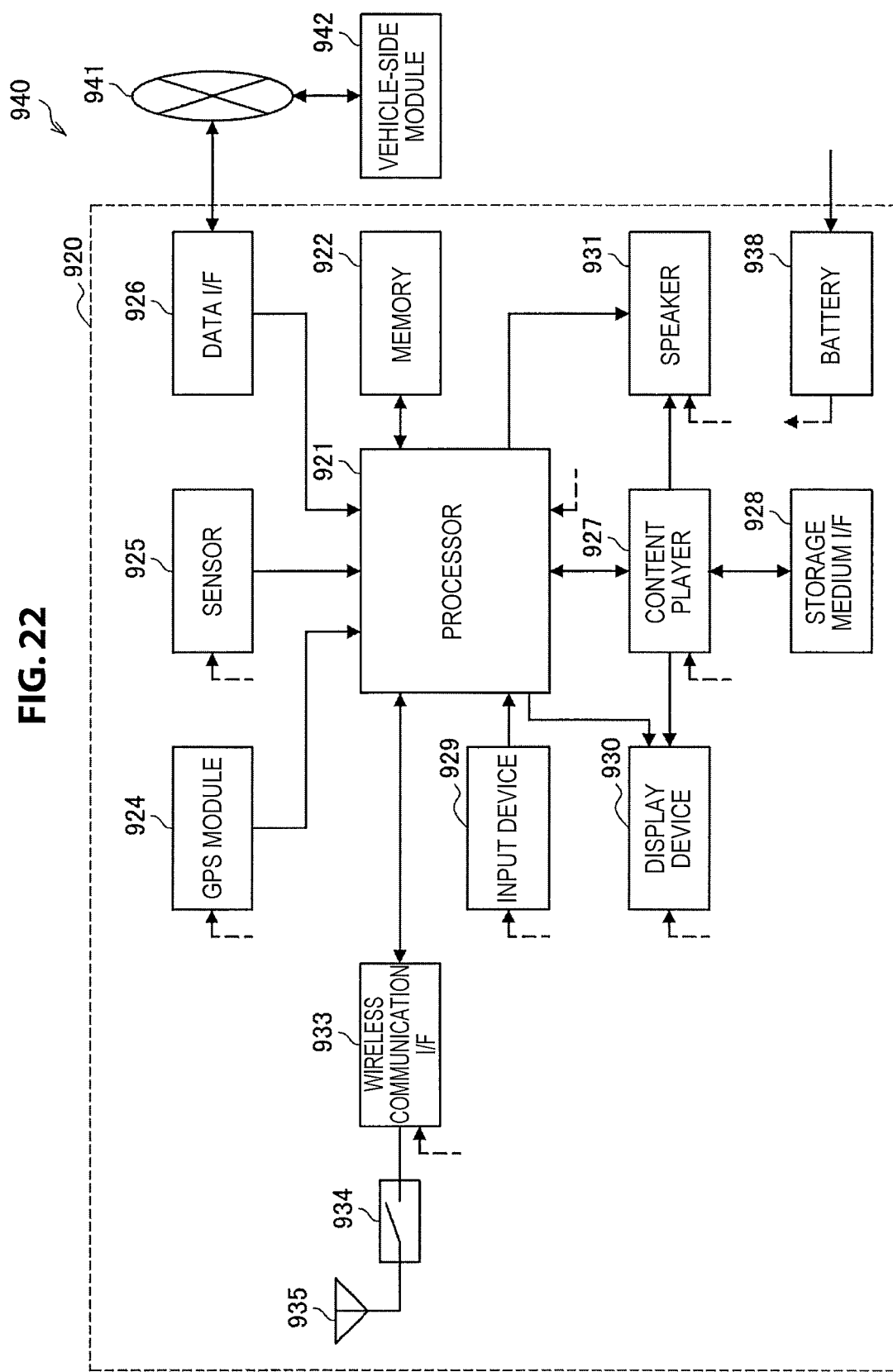
FIG. 22 is a block diagram illustrating an example of a schematic configuration of a car navigation device.

FIG. 22 is a block diagram showing an example of a schematic configuration of a car navigation device 920 to which the technology of the present disclosure can be applied. The car navigation device 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, a CPU or an SoC controlling a navigation function and other functions of the car navigation device 920. The memory 922 includes a RAM and a ROM storing programs executed by the processor 921 and data.

The GPS module 924 measures a position of the car navigation device 920 (for example, latitude, longitude, and altitude) using GPS signals received from a GPS satellite. The sensor 925 can include a sensor group including, for example, a gyro sensor, a geomagnetic sensor, a pneumatic sensor, and the like. The data interface 926 is connected to an in-vehicle network 941 via, for example, a terminal that is not illustrated to acquire data generated on the vehicle side such as car speed data.

The content player 927 reproduces content stored in a storage medium (for example, a CD or a DVD) inserted into the storage medium interface 928. The input device 929 includes, for example, a touch sensor that detects touches on a screen of the display device 930, buttons, switches, and the like to receive manipulations or information inputs from a user. The display device 930 has a screen such as an LCD or an OLED display to display images of the navigation function or reproduced content. The speaker 931 outputs sounds of the navigation function or reproduced content.

The wireless communication interface 933 supports one or more wireless LAN standards of IEEE 802.11a, 11b, 11g, 11n, 11ac, and 11ad, to execute wireless LAN communication. The wireless communication interface 933 can communicate with another device via a wireless LAN access point in the infrastructure mode. In addition, the wireless communication interface 933 can directly communicate with another device in a direct communication mode such as an ad hoc mode or Wi-Fi Direct. The wireless communication interface 933 can typically have a baseband processor, an RF circuit, a power amplifier, and the like. The wireless communication interface 933 may be a single-chip module on which a memory that stores a communication control program, a processor that executes the program, and a relevant circuit are integrated. The wireless communication interface 933 may support another kind of wireless communication scheme such as a short-range wireless communication scheme, a proximity wireless communication scheme, or the cellular communication scheme in addition to the wireless LAN scheme. The antenna switch 934 switches a connection destination of the antenna 935 for a plurality of circuits included in the wireless communication interface 933. The antenna 935 has a single or a plurality of antenna elements and is used for transmission and reception of wireless signals from the wireless communication interface 933.

Note that the car navigation device 920 may include a plurality of antennas, without being limited to the example of FIG. 22. In this case, the antenna switch 934 may be omitted from the configuration of the car navigation device 920.

The battery 938 supplies electric power to each of the blocks of the car navigation device 920 shown in FIG. 22 via power supply lines partially indicated by dashed lines in the drawing. In addition, the battery 938 accumulates electric power supplied from the vehicle.

In the car navigation device 920 illustrated in FIG. 22, the data processing unit HO, the control unit 120, and the wireless communication unit 130 described above with reference to FIG. 4 may be implemented in the wireless communication interface 933. At least some of the functions may be implemented in the processor 921. For example, the control unit 120 causes the data processing unit 110 to generate the response UL frame serving as the response to the trigger frame on the basis of the resource information and the attribute information included in the received trigger frame, and causes the wireless communication unit 130 to transmit the generated response UL frame. As a result, the number of frames transmitted in the UL communication of the random access scheme performed by the car navigation device 920 is reduced, the frame collision is consequently suppressed and thus the decrease in the communication efficiency can be suppressed. For example, the control unit 120 causes the data processing unit 110 to generate the response UL frame serving as the response to the trigger frame on the basis of the sub area information included in the received trigger frame, and causes the wireless communication unit 130 to transmit the generated response UL frame. As a result, the ULR is efficiently detected in the UL communication of the random access scheme performed by the car navigation device 920, and thus the decrease in the communication efficiency can be suppressed.

Further, the wireless communication interface 933 may operate as the AP 10 and provide a wireless connection to the terminal of the user in the vehicle. At this time, for example, the control unit 120 causes the data processing unit 110 to generate the trigger frame including the resource information and the attribute information, and causes the wireless communication unit 130 to transmit the generated trigger frame. Then, the response UL frame serving as the response to the trigger frame is received by the wireless communication unit 130. Thus, the number of response UL frames transmitted from the terminal of the user according to the random access scheme is reduced, and thus the decrease in the communication efficiency is suppressed. For example, the control unit 120 causes the data processing unit 110 to generate the trigger frame including the sub area information, and causes the wireless communication unit 130 to transmit the generated trigger frame. Then, the response UL frame serving as the response to the trigger frame is received by the wireless communication unit 130. Thus, the ULR of the terminal of the user is efficiently detected, and the decrease in the communication efficiency of the UL communication of the random access scheme performed by the terminal may be suppressed.

Further, the technology of the present disclosure may be realized as an in-vehicle system (or a vehicle) 940 including one or more blocks of the above-described car navigation device 920, an in-vehicle network 941, and a vehicle-side module 942. The vehicle-side module 942 generates vehicle-side data such as a vehicle speed, the number of engine rotations, or failure information and outputs the generated data to the in-vehicle network 941.

4-3. Third Application Example

Figure 23:
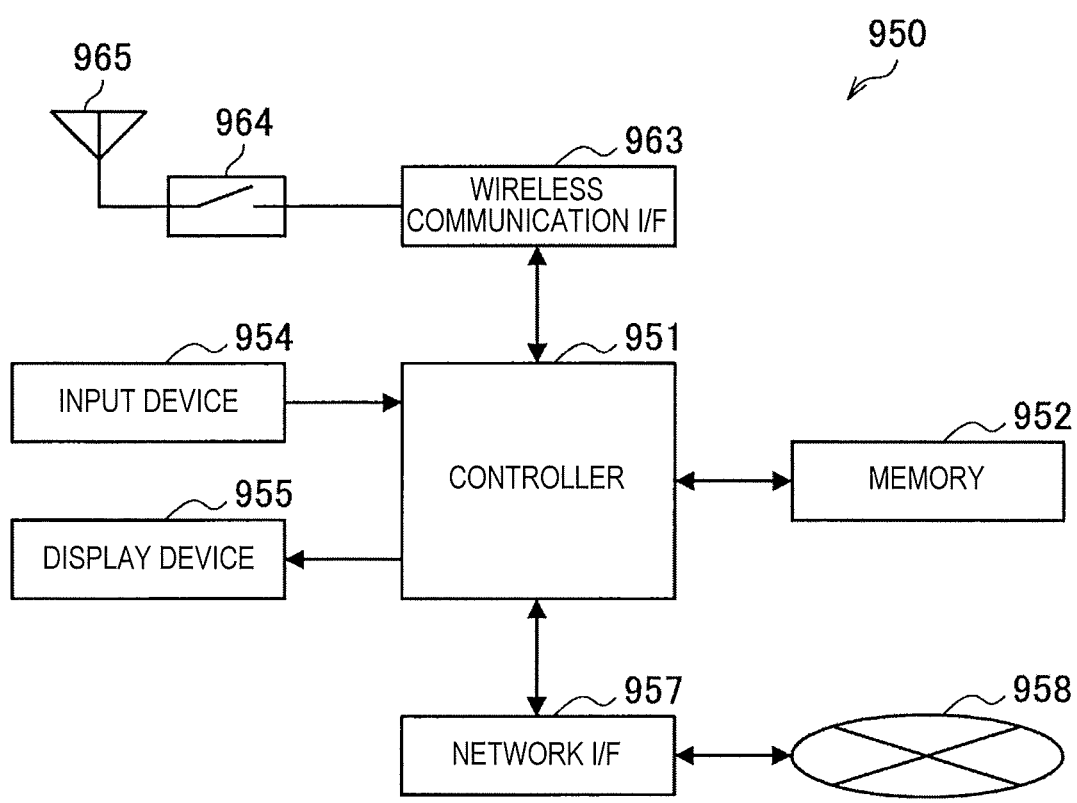
FIG. 23 is a block diagram illustrating an example of a schematic configuration of a wireless access point.

FIG. 23 is a block diagram showing an example of a schematic configuration of a wireless access point 950 to which the technology of the present disclosure can be applied. The wireless access point 950 includes a controller 951, a memory 952, an input device 954, a display device 955, a network interface 957, a wireless communication interface 963, an antenna switch 964, and an antenna 965.

The controller 951 may be, for example, a CPU or a digital signal processor (DSP) and operates various functions (for example, access limitation, routing, encryption, a fire wall, and log management) of the Internet Protocol (IP) layer and higher layers of the wireless access point 950. The memory 952 includes a RAM and a ROM and stores a program executed by the controller 951 and various kinds of control data (for example, a terminal list, a routing table, an encryption key, security settings, and a log).

The input device 954 includes, for example, a button or a switch, and receives a manipulation from a user. The display device 955 includes an LED lamp and displays an operation status of the wireless access point 950.

The network interface 957 is a wired communication interface that connects the wireless access point 950 to a wired communication network 958. The network interface 957 may include a plurality of connection terminals. The wired communication network 958 may be a LAN such as Ethernet (registered trademark) or may be a Wide Area Network (WAN).

The wireless communication interface 963 supports one or more wireless LAN standards of IEEE 802.11a, 11b, 11g, 11n, 11ac, and 11ad, to supply wireless connection to a nearby terminal as an access point. The wireless communication interface 963 can typically include a baseband processor, an RF circuit, and a power amplifier. The wireless communication interface 963 may be a one-chip module in which a memory storing a communication control program, a processor executing the program, and relevant circuits are integrated. The antenna switch 964 switches a connection destination of the antenna 965 among a plurality of circuits included in the wireless communication interface 963. The antenna 965 includes one antenna element or a plurality of antenna elements and is used to transmit and receive a wireless signal through the wireless communication interface 963.

In the wireless access point 950 illustrated in FIG. 23, the data processing unit 110, the control unit 120, and the wireless communication unit 130 described above with reference to FIG. 4 are implemented in the wireless communication interface 963. At least some of the functions may be implemented in the controller 951. For example, the control unit 120 causes the data processing unit 110 to generate the trigger frame including the resource information and the attribute information, and causes the wireless communication unit 130 to transmit the generated trigger frame. Then, the response UL frame serving as the response to the trigger frame is received by the wireless communication unit 130. Thus, the number of response UL frames transmitted from the STA 20 according to the random access scheme is reduced, and thus the decrease in the communication efficiency is suppressed. For example, the control unit 120 causes the data processing unit 110 to generate the trigger frame including the sub area information, and causes the wireless communication unit 130 to transmit the generated trigger frame. Then, the response UL frame serving as the response to the trigger frame is received by the wireless communication unit 130. Thus, the ULR of the STA 20 is efficiently detected, and the decrease in the communication efficiency of the UL communication of the random access scheme performed by the STA 20 can be suppressed.

5. CONCLUSION

According to the first embodiment of the present disclosure, only transmission of a specific response UL frame is performed on the basis of the attribute information, and thus resources used for the response UL frame transmitted in the UL communication of the random access scheme are reduced. As a result, a possibility that frame collision will occur is lower than in a case where an arbitrary STA 20-1 transmits the UL frame, and it is possible to suppress a decrease in the communication efficiency of the UL communication of the random access scheme.

Further, according to the second embodiment of the present disclosure, the sub area is specified from the resources used for the UL transmission of the random access scheme, and thus the UL transmission can be distinguished by the sub area. Further, through the distinguishing of the UL transmission in accordance with the sub area, information related to the communication parameter of the UL transmission can be efficiently collected, and the communication efficiency of the UL communication of the random access scheme can be suppressed from being lowered.

It should be understood by those skilled in the art that various modifications, combinations, sub-combinations and alterations may occur depending on design requirements and other factors insofar as they are within the scope of the appended claims or the equivalents thereof.

For example, the above embodiments have been described in connection with the example in which the response UL frame is transmitted through a plurality of resource units of different frequency channels, but the present technology is not limited to this example. For example, in a case where the STA 20 has a plurality of antennas and supports space division multiplex communication, the response UL frame may be transmitted through a plurality of resource units of different space streams.

Further, the above embodiments have been described in connection with the example in which 12 resource units, 16 resource units, or 32 resource units are prepared, but the number of resource units may be smaller or larger.

Further, in the above embodiments, the transmission setting condition setting example and the resource unit (resource area) setting example are illustrated in FIG. 14 and FIGS. 15A to 15C, but the settings of the transmission setting condition and the resource unit are not limited thereto, and various settings can be performed.

Further, the processes according to the above embodiments and the modified examples may be recombined or combined. For example, both the attribute information of the STA 20 according to the first embodiment and the attribute information of the frame according to the first modified example may be included in the trigger frame.

Further, in addition, the effects described in the present specification are merely illustrative and demonstrative, and not limitative. In other words, the technology according to the present disclosure can exhibit other effects that are evident to those skilled in the art along with or instead of the effects on the basis of the present specification.

Further, the steps illustrated in the flowcharts in the above-described embodiment naturally include processes performed in the described and chronological order, and further include processes that are not necessarily performed in chronological order, but are also performed in parallel or are individually performed. It is also possible to change the order as necessary even in the steps for chronologically performing the processes.

Additionally, the present technology may also be configured as below.

(1) A communication apparatus, including:
a communication unit configured to transmit a first frame including wireless communication resource information in which resources selectable as uplink resources are specified from a plurality of resources and attribute information related to transmission of a second frame and receive the second frame transmitted as a response to the first frame.

(2) The communication apparatus according to (1),
in which the communication unit receives the second frame on the basis of the wireless communication resource information included in the first frame.

(3) The communication apparatus according to (1) or (2),
in which the second frame is transmitted using at least one resource selected from the selectable resources specified in the wireless communication resource information on the basis of the attribute information related to the transmission of a response UL frame.

(4) The communication apparatus according to any one of (1) to (3),
in which the attribute information related to the transmission of the second frame includes attribute information of a transmission apparatus performing the transmission of the second frame.

(5) The communication apparatus according to (4),
in which the attribute information of the transmission apparatus includes information related to presence or absence of an uplink communication request.

(6) The communication apparatus according to (5),
in which the uplink communication request includes a data transmission request.

(7) The communication apparatus according to (5) or (6),
in which the uplink communication request includes a communication connection request.

(8) The communication apparatus according to any one of (5) to (7),
in which the second frame includes information related to content of the uplink communication request.

(9) The communication apparatus according to any one of (4) to (8),
in which the attribute information of the transmission apparatus includes information related to a communication state of the transmission apparatus.

(10) The communication apparatus according to (9),
in which the communication state includes information related to a communication quality.

(11) The communication apparatus according to (9) or (10),
in which the communication state includes information related to a state of a communication channel.

(12) The communication apparatus according to any one of (9) to (11),
in which the second frame includes information related to content of the communication state of the transmission apparatus.

(13) The communication apparatus according to any one of (1) to (12), in which the attribute information related to the transmission of the second frame includes information related to an attribute of the second frame.

(14) The communication apparatus according to (13), in which the attribute of the second frame includes a type of frame.

(15) A communication apparatus, including:
a communication unit configured to receive a first frame including wireless communication resource information in which resources selectable as uplink resources are specified from a plurality of resources and attribute information related to transmission of a second frame and transmit the second frame as a response to the first frame.

(16) The communication apparatus according to (15),
in which the communication unit transmits the second frame using at least one resource selected from the selectable resources specified in the wireless communication resource information on the basis of the attribute information related to the transmission of the second frame.

(17) The communication apparatus according to (16),
in which the attribute information related to the transmission of the second frame includes attribute information of a transmission apparatus performing the transmission of the second frame, and
the communication unit transmits the second frame in a case where the attribute information of the communication apparatus corresponds to the attribute information of the transmission apparatus.

(18) The communication apparatus according to (16) or (17),
in which the attribute information related to the transmission of the second frame includes information related to an attribute of the second frame, and
the communication unit transmits a frame in which an attribute of the frame corresponds to an attribute of the second frame as the second frame.

(19) A communication method, including:
transmitting a first frame including wireless communication resource information in which resources selectable as uplink resources are specified from a plurality of resources and attribute information related to transmission of a second frame; and
receiving the second frame transmitted as a response to the first frame.

(20) A communication method, including:
receiving a first frame including wireless communication resource information in which resources selectable as uplink resources are specified from a plurality of resources and attribute information related to transmission of a second frame; and
transmitting the second frame as a response to the first frame.

Further, the following configurations also belong to the technical scope of the present disclosure as well.

(1) A communication apparatus, including:
a communication unit configured to transmit a trigger frame including sub area information in which a sub area is specified from a resource area including wireless communication resources selectable as uplink resources and receive a response frame to the trigger frame.

(2) The communication apparatus according to (1),
in which the communication unit receives the response frame on the basis of the sub area information.

(3) The communication apparatus according to (1) or (2),
in which the response frame is transmitted using at least one wireless communication resource selected from the sub area.

(4) The communication apparatus according to any one of (1) to (3),
in which the response frame includes a frame related to an uplink communication request.

(5) The communication apparatus according to any one of (1) to (4),
in which the sub area is decided on the basis of attribute information associated with transmission of an uplink frame related to the response frame.

(6) The communication apparatus according to (5),
in which the attribute information associated with the transmission of the uplink frame includes a type of frame.

(7) The communication apparatus according to (5) or (6),
in which the attribute information associated with the transmission of the uplink frame includes a size of data to be transmitted.

(8) The communication apparatus according to any one of (5) to (7),
in which the attribute information associated with the transmission of the uplink frame includes information related to redundancy of communication of the uplink frame.

(9) The communication apparatus according to (8),
in which the information related to the redundancy of communication includes information related to at least one of a modulation scheme and a coding rate.

(10) The communication apparatus according to any one of (5) to (9),
in which the attribute information associated with the transmission of the uplink frame includes information related to a communication state of a transmission apparatus of the uplink frame.

(11) The communication apparatus according to (10),
in which the information related to the communication state of the transmission apparatus includes information related to radio wave propagation characteristics.

(12) The communication apparatus according to any one of (1) to (11),
in which the trigger frame is transmitted for each channel of a channel bonding target.

(13) The communication apparatus according to any one of (1) to (12),
in which, in a case where a signal is detected in the sub area, the communication unit detects the presence of a response frame on the basis of the sub area information.

(14) The communication apparatus according to any one of (1) to (13),
in which, when a signal for the response frame is received, the communication unit transmits a frame serving as a response to the response frame.

(15) A communication apparatus, including:
a communication unit configured to receive a trigger frame including sub area information in which a sub area is specified from a resource area including wireless communication resources selectable as uplink resources and transmit a response frame to the trigger frame.

(16) The communication apparatus according to (15),
in which the communication unit transmits the response frame using at least one of the wireless communication resources selected from the sub area specified from the sub area information.

(17) The communication apparatus according to (15) or (16),
in which, in a case where the communication apparatus is able to use a plurality of channels at the same time, the communication unit transmits the response frame using a plurality of wireless communication resources selected from the sub area on the basis of the plurality of channels.

(18) The communication apparatus according to any one of (15) to (17), in which, in a case where importance of an uplink frame related to the response frame is higher than importance of other frames, the communication unit transmits the response frame using a plurality of wireless communication resources selected from the sub area.

(19) A communication method, including:

transmitting a trigger frame including sub area information in which a sub area is specified from a resource area including wireless communication resources selectable as uplink resources; and receiving a response frame to the trigger frame.

(20) A communication method, including:

receiving a trigger frame including sub area information in which a sub area is specified from a resource area including wireless communication resources selectable as uplink resources; and transmitting a response frame to the trigger frame.

REFERENCE SIGNS LIST

10 AP
20 STA
100 wireless communication apparatus
110 data processing unit
111 interface unit
112 transmission buffer
113 transmission frame constructing unit
114 reception frame analyzing unit
115 reception buffer
120 control unit
121 operation control unit
122 signal control unit
130 wireless communication unit
131 transmission processing unit
132 reception processing unit
133 antenna control unit

The invention claimed is:

1. A communication apparatus, comprising:
a memory; and
processing circuitry configured to
control transmission of a trigger frame to another communication apparatus being capable of random access, the trigger frame including sub area information in which a sub area is specified from a resource area including wireless communication resources selectable as uplink resources; and
control reception of a response frame to the trigger frame, the response frame being transmitted using at least one wireless communication resource selected from the sub area, wherein
the sub area information includes a plurality of sub area fields, each of the sub area fields including a condition parameter field associated with a sub area,
each of the condition parameter fields includes information related to a modulation scheme and a coding rate, and
in a case where importance of an uplink frame related to the response frame is higher than importance of other frames, the response frame is transmitted using a plurality of wireless communication resources selected from the sub area.

2. The communication apparatus according to claim 1, wherein the processing circuitry controls the reception of the response frame on the basis of the sub area information.

3. The communication apparatus according to claim 1, wherein the response frame includes a frame related to an uplink communication request.

4. The communication apparatus according to claim 1, wherein the sub area is decided on the basis of attribute information associated with transmission of an uplink frame related to the response frame.

5. The communication apparatus according to claim 4, wherein the attribute information associated with the transmission of the uplink frame includes a type of frame.

6. The communication apparatus according to claim 4, wherein the attribute information associated with the transmission of the uplink frame includes a size of data to be transmitted.

7. The communication apparatus according to claim 4, wherein the attribute information associated with the transmission of the uplink frame includes information related to redundancy of communication of the uplink frame.

8. The communication apparatus according to claim 7, wherein the information related to the redundancy of communication includes the information related to the modulation scheme and the coding rate.

9. The communication apparatus according to claim 4, wherein the attribute information associated with the transmission of the uplink frame includes information related to a communication state of a transmission apparatus of the uplink frame.

10. A communication apparatus, comprising:
a memory; and
processing circuitry configured to
control transmission of a trigger frame including sub area information in which a sub area is specified from a resource area including wireless communication resources selectable as uplink resources; and
control reception of a response frame to the trigger frame, wherein
the sub area is decided on the basis of attribute information associated with transmission of an uplink frame related to the response frame,
the attribute information associated with the transmission of the uplink frame includes information related to a communication state of a transmission apparatus of the uplink frame, and
the information related to the communication state of the transmission apparatus includes information related to radio wave propagation characteristics.

11. The communication apparatus according to claim 1, wherein the trigger frame is transmitted for each channel of a channel bonding target.

12. The communication apparatus according to claim 1, wherein, in a case where a signal is detected in the sub area, the processing circuitry detects the presence of a response frame on the basis of the sub area information.

13. The communication apparatus according to claim 1, wherein, when a signal for the response frame is received, the processing circuitry controls transmission of a frame serving as a response to the response frame.

14. A communication apparatus, comprising:
a memory; and
processing circuitry being capable of random access configured to control reception of a trigger frame including sub area information in which a sub area is specified from a resource area including wireless communication resources selectable as uplink resources; and control transmission of a response frame to the trigger frame using at least one of the wireless communication resources selected from the sub area specified from the sub area information, wherein the sub area information includes a plurality of sub area fields, each of the sub area fields including a condition parameter field associated with a sub area, each of the condition parameter fields includes information related to a modulation scheme and a coding rate, and in a case where importance of an uplink frame related to the response frame is higher than importance of other frames, the processing circuitry controls the transmission of the response frame using a plurality of wireless communication resources selected from the sub area.

15. A communication apparatus, comprising:
a memory; and
processing circuitry configured to
control reception of a trigger frame including sub area information in which a sub area is specified from a resource area including wireless communication resources selectable as uplink resources; and
control transmission of a response frame to the trigger frame, wherein
in a case where the communication apparatus is able to use a plurality of channels at the same time, the processing circuitry controls the transmission of the response frame using a plurality of wireless communication resources selected from the sub area on the basis of the plurality of channels.

16. A communication method, comprising:
controlling, using processing circuitry, transmission of a trigger frame to another communication apparatus being capable of random access, the trigger frame including sub area information in which a sub area is specified from a resource area including wireless communication resources selectable as uplink resources; and controlling, using the processing circuitry, reception of a response frame to the trigger frame, the response frame being transmitted using at least one wireless communication resource selected from the sub area, wherein the sub area information includes a plurality of sub area fields, each of the sub area fields including a condition parameter field associated with a sub area, each of the condition parameter fields includes information related to a modulation scheme and a coding rate, and in a case where importance of an uplink frame related to the response frame is higher than importance of other frames, the response frame is transmitted using a plurality of wireless communication resources selected from the sub area.

17. A communication method, comprising:
controlling, using processing circuitry being capable of random access, reception of a trigger frame including sub area information in which a sub area is specified from a resource area including wireless communication resources selectable as uplink resources; and controlling, using the processing circuitry, transmission of a response frame to the trigger frame using at least one of the wireless communication resources selected from the sub area specified from the sub area information, wherein the sub area information includes a plurality of sub area fields, each of the sub area fields including a condition parameter field associated with a sub area, each of the condition parameter fields includes information related to a modulation scheme and a coding rate, and in a case where importance of an uplink frame related to the response frame is higher than importance of other frames, the controlling the transmission of the response frame transmits the response frame using a plurality of wireless communication resources selected from the sub area.

* * * * *